US012776993B1

(12) United States Patent
Awan

(10) Patent No.: US 12,776,993 B1
(45) Date of Patent: Oct. 27, 2026

(54) SYSTEMS AND METHODS FOR CONFIGURABLE TIMER FOR PROCESSING NETWORK MESSAGES IN QUEUED PROCESSING ENVIRONMENTS

(71) Applicant: DK Crown Holdings Inc., Boston, MA (US)

(72) Inventor: Rizwan Ahmad Awan, Lexington, MA (US)

(73) Assignee: DK Crown Holdings Inc., Boston, MA (US)

( * ) Notice: Subject to any disclaimer, the term of this patent is extended or adjusted under 35 U.S.C. 154(b) by 0 days.

(21) Appl. No.: 19/570,431

(22) Filed: Mar. 18, 2026

(51) Int. Cl.
*H04L 47/28* (2022.01)

(52) U.S. Cl.
CPC .................................... *H04L 47/28* (2013.01)

(58) Field of Classification Search
CPC ....................................................... H04L 47/28
See application file for complete search history.

(56) References Cited

U.S. PATENT DOCUMENTS

2013/0060653 A1* 3/2013 Sharkey ................ H04L 69/321 709/228
2022/0287142 A1* 9/2022 Li ............................ H04L 5/14
2023/0275977 A1* 8/2023 Begen ................. H04L 43/0852 709/217

* cited by examiner

*Primary Examiner* — Kiet Tang
(74) *Attorney, Agent, or Firm* — Foley & Lardner LLP

(57) ABSTRACT

Systems and methods for implementing configurable timers for processing network messages in queued processing environments are disclosed. A system can receive a first request to generate a first data record corresponding to an event, the first request comprising a first latency parameter, and can receive a second request to generate a second data record corresponding to the event that includes a second latency parameter different from the first latency parameter. The system can generate the first data record in association with the first latency parameter and the second data record in association with the second latency parameter. The system can receive an operation request corresponding to the event, initiate a timer corresponding to the operation request, determine that the timer satisfies at least one of the first or second latency parameter, and execute the operation request with respect to the first or second data record based on the determination.

20 Claims, 7 Drawing Sheets

300

SYSTEMS AND METHODS FOR CONFIGURABLE TIMER FOR PROCESSING NETWORK MESSAGES IN QUEUED PROCESSING ENVIRONMENTS

BACKGROUND

Providing synchronized information is useful for networked computing environments including multiple computing systems. Information can be shared using different formats or protocols. It is challenging to provide synchronized information efficiently in computing systems via computer networks having different types of computing devices.

SUMMARY

At least one aspect relates to a system. The system can include one or more processors coupled to non-transitory memory. The system can receive, from a first computing system, a first request to generate a first data record corresponding to an event, the first request comprising a first latency parameter, the first latency parameter being a configurable parameter that specifies a first minimum processing delay for operations identifying the event. The system can receive, from a second computing system, a second request to generate a second data record corresponding to the event, the second request comprising a second latency parameter, the second latency parameter specifying a second minimum processing delay for operations identifying the second data record, the second latency parameter different from the first latency parameter. The system can generate, based on the first request and the second request, the first data record in association with the first latency parameter and the second data record in association with the second latency parameter. The system can receive an operation request corresponding to the event. The system can initiate a timer corresponding to receipt of the operation request. The system can determine that the timer satisfies at least one of the first latency parameter or the second latency parameter. The system can execute the operation request with respect to the first data record based on determining that the timer satisfies the first latency parameter, or execute the operation request with respect to the second data record based on determining that the timer satisfies the second latency parameter.

In some implementations, the system can queue the operation request in an operation queue corresponding to the event. In some implementations, the operation request specifies a quantity and a price, and the system can execute the operation request with respect to the first data record based on executing at least a portion of the quantity with respect to the first data record. In some implementations, the system can determine, based on a remaining quantity of the operation request after executing with respect to the first data record, that a portion of the operation request remains unexecuted. In some implementations, the system can maintain the timer for the operation request to permit subsequent executing of the portion of the operation request with respect to the second data record upon determining that the timer satisfies the second latency parameter. In some implementations, the system can remove the timer in response to executing the portion of the operation request with respect to the second data record.

In some implementations, the operation request is a first operation request, and the system can determine, based on executing the operation request, that the first data record is closed. In some implementations, the system can determine that a second timer associated with a second operation request for the event satisfies the second latency parameter. In some implementations, the system can execute the second operation request with respect to the second data record based on determining that the second timer satisfies the second latency parameter.

In some implementations, the system can receive, from a third computing system, a third request to generate a third data record. In some implementations, the system can generate the third data record such that the third data record is assigned to a default latency parameter. In some implementations, the system can compare, based on initiating the timer for the operation request, the timer with the first latency parameter, the second latency parameter, and the default latency parameter.

In some implementations, the system can store a timestamp corresponding to a time the operation request is received. In some implementations, the system can calculate an elapsed time for the operation request based on the timestamp and a current time. In some implementations, the system can store, in association with the event, a data structure identifying the first data record and the second data record and their respective configuration settings. In some implementations, the system can update the data structure in response to executing at least a portion of the operation request.

At least one other aspect relates to a method. The method can be performed, for example, by one or more processors coupled to non-transitory memory. The method can include receiving, from a first computing system, a first request to generate a first data record corresponding to an event, the first request comprising a first latency parameter, the first latency parameter being a configurable parameter that specifies a first minimum processing delay for operations identifying the event. The method can include receiving, from a second computing system, a second request to generate a second data record corresponding to the event, the second request comprising a second latency parameter, the second latency parameter specifying a second minimum processing delay for operations identifying the second data record, the second latency parameter different from the first latency parameter. The method can include generating, based on the first request and the second request, the first data record in association with the first latency parameter and the second data record in association with the second latency parameter. The method can include receiving an operation request corresponding to the event. The method can include initiating a timer corresponding to receipt of the operation request. The method can include determining that the timer satisfies at least one of the first latency parameter or the second latency parameter. The method can include executing the operation request with respect to the first data record based on determining that the timer satisfies the first latency parameter, or executing the operation request with respect to the second data record based on determining that the timer satisfies the second latency parameter.

In some implementations, the method can include queuing the operation request in an operation queue corresponding to the event. In some implementations, the operation request specifies a quantity and a price, and the method can include executing the operation request with respect to the first data record based on executing at least a portion of the quantity with respect to the first data record. In some implementations, the method can include determining, based on a remaining quantity of the operation request after executing with respect to the first data record, that a portion of the operation request remains unexecuted. In some implementations, the method can include maintaining the timer for the operation request to permit subsequent executing of the portion of the operation request with respect to the second data record upon determining that the timer satisfies the second latency parameter. In some implementations, the method can include removing the timer in response to executing the portion of the operation request with respect to the second data record.

In some implementations, the operation request is a first operation request, and the method can include determining, based on executing the operation request, that the first data record is closed. In some implementations, the method can include determining that a second timer associated with a second operation request for the event satisfies the second latency parameter. In some implementations, the method can include executing the second operation request with respect to the second data record based on determining that the second timer satisfies the second latency parameter.

In some implementations, the method can include receiving, from a third computing system, a third request to generate a third data record. In some implementations, the method can include generating the third data record such that the third data record is assigned to a default latency parameter. In some implementations, the method can include comparing, based on initiating the timer for the operation request, the timer with the first latency parameter, the second latency parameter, and the default latency parameter.

In some implementations, the method can include storing a timestamp corresponding to a time the operation request is received. In some implementations, the method can include calculating an elapsed time for the operation request based on the timestamp and a current time. In some implementations, the method can include storing, in association with the event, a data structure identifying the first data record and the second data record and their respective configuration settings. In some implementations, the method can include updating the data structure in response to executing at least a portion of the operation request.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form, for example, by appropriate computer programs, which may be carried on appropriate carrier media (computer readable media), which may be tangible carrier media (e.g., disks) or intangible carrier media (e.g., communications signals). Aspects may also be implemented using any suitable apparatus, which may take the form of programmable computers running computer programs arranged to implement the aspect. As used in the specification and in the claims, the singular form of 'a,' 'an,' and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Below are detailed descriptions of various concepts related to, and approaches, methods, apparatuses, and systems for implementing the various techniques described herein. The various concepts introduced above and discussed in greater detail below may be implemented in any of numerous ways, as the described concepts are not limited to any particular manner of implementation. Examples of specific implementations and applications are provided primarily for illustrative purposes.

For purposes of reading the description of the various implementations below, the following descriptions of the sections of the Specification and their respective contents may be helpful.

Section A describes a network environment and computing environment to implement embodiments described herein.

Section B describes systems and methods for configurable timer for processing network messages in queued processing environments, in accordance with one or more implementations.

A. Computing and Network Environment

Figure 1A:
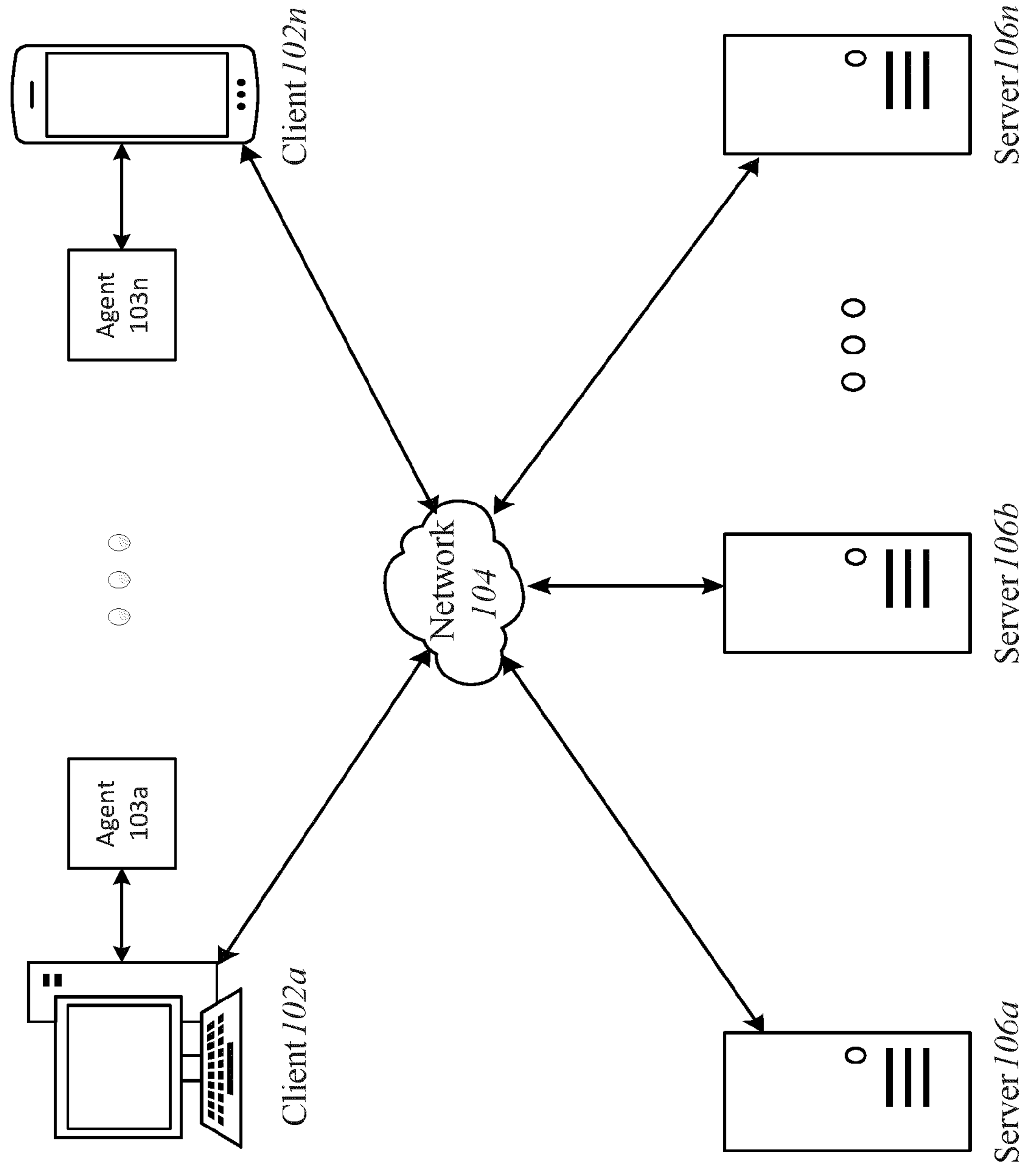
FIG. 1A is a block diagram depicting an embodiment of a network environment comprising a client device in communication with a server device.

Referring to FIG. 1A, an implementation of a network environment is depicted for managing network communication sessions of network applications. In brief overview, the network environment includes one or more clients 102*a*-102*n* (also generally referred to as local machine(s) 102, client(s) 102, client node(s) 102, client machine(s) 102, client computer(s) 102, client device(s) 102, endpoint(s) 102, or endpoint node(s) 102) in communication with one or more agents 103*a*-103*n* and one or more servers 106*a*-106*n* (also generally referred to as server(s) 106, node 106, or remote machine(s) 106) via one or more networks 104. In some implementations, a client 102 has the capacity to function as both a client node seeking access to resources provided by a server and as a server providing access to hosted resources for other clients 102*a*-102*n*.

Although FIG. 1A shows a network 104 between the clients 102 and the servers 106, the clients 102 and the servers 106 may be on the same network 104. In some implementations, there are multiple networks 104 between the clients 102 and the servers 106. In one of these implementations, a network 104' (not shown) may be a private network and a network 104 may be a public network. In another of these implementations, a network 104 may be a private network and a network 104' a public network. In still another of these implementations, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel, or satellite band. The wireless links may also include any cellular network standards used to communicate among mobile devices, including standards that qualify as 1G, 2G, 3G, 4G, or 5G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods, e.g., FDMA, TDMA, CDMA, or SDMA. In some implementations, different types of data may be transmitted via different links and standards. In other implementations, the same types of data may be transmitted via different links and standards.

The network 104 may be any type and/or form of network. The geographical scope of the network 104 may vary widely and the network 104 can be a body area network (BAN), a personal area network (PAN), a local-area network (LAN) (e.g., Intranet), a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some implementations, the system may include multiple, logically-grouped servers 106. In one of these implementations, the logical group of servers may be referred to as a server farm 38 (not shown) or a machine farm 38. In another of these implementations, the servers 106 may be geographically dispersed. In other implementations, a machine farm 38 may be administered as a single entity. In still other implementations, the machine farm 38 includes a plurality of machine farms 38. The servers 106 within each machine farm 38 can be heterogeneous-one or more of the servers 106 or remote machines 106 can operate according to one type of operating system platform (e.g., WINDOWS NT, manufactured by Microsoft Corp. of Redmond, Washington), while one or more of the other servers 106 can operate according to another type of operating system platform (e.g., Unix, Linux, or Mac OS X).

In one implementation, servers 106 in the machine farm 38 may be stored in high-density rack systems, along with associated storage systems, and located in an enterprise data center. In this implementation, consolidating the servers 106 in this way may improve system manageability, data security, the physical security of the system, and system performance by locating servers 106 and high performance storage systems on localized high performance networks 104. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these implementations, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc.; the HYPER-V hypervisors provided by Microsoft, or others. Hosted hypervisors may run within an operating system on a second software level. Examples of hosted hypervisors may include VMware Workstation and VIRTUALBOX.

Management of the machine farm 38 may be decentralized. For example, one or more servers 106 may comprise components, subsystems, and modules to support one or more management services for the machine farm 38. In one of these implementations, one or more servers 106 provide functionality for management of dynamic data, including techniques for handling failover, data replication, and increasing the robustness of the machine farm 38. Each server 106 may communicate with a persistent store and, in some implementations, with a dynamic store.

Server 106 may be a file server, application server, web server, proxy server, appliance, network appliance, gateway, gateway server, virtualization server, deployment server, SSL VPN server, or firewall. In one implementation, the server 106 may be referred to as a remote machine or a node. In another implementation, a plurality of nodes 106 may be in the path between any two communicating servers.

Figure 1B:
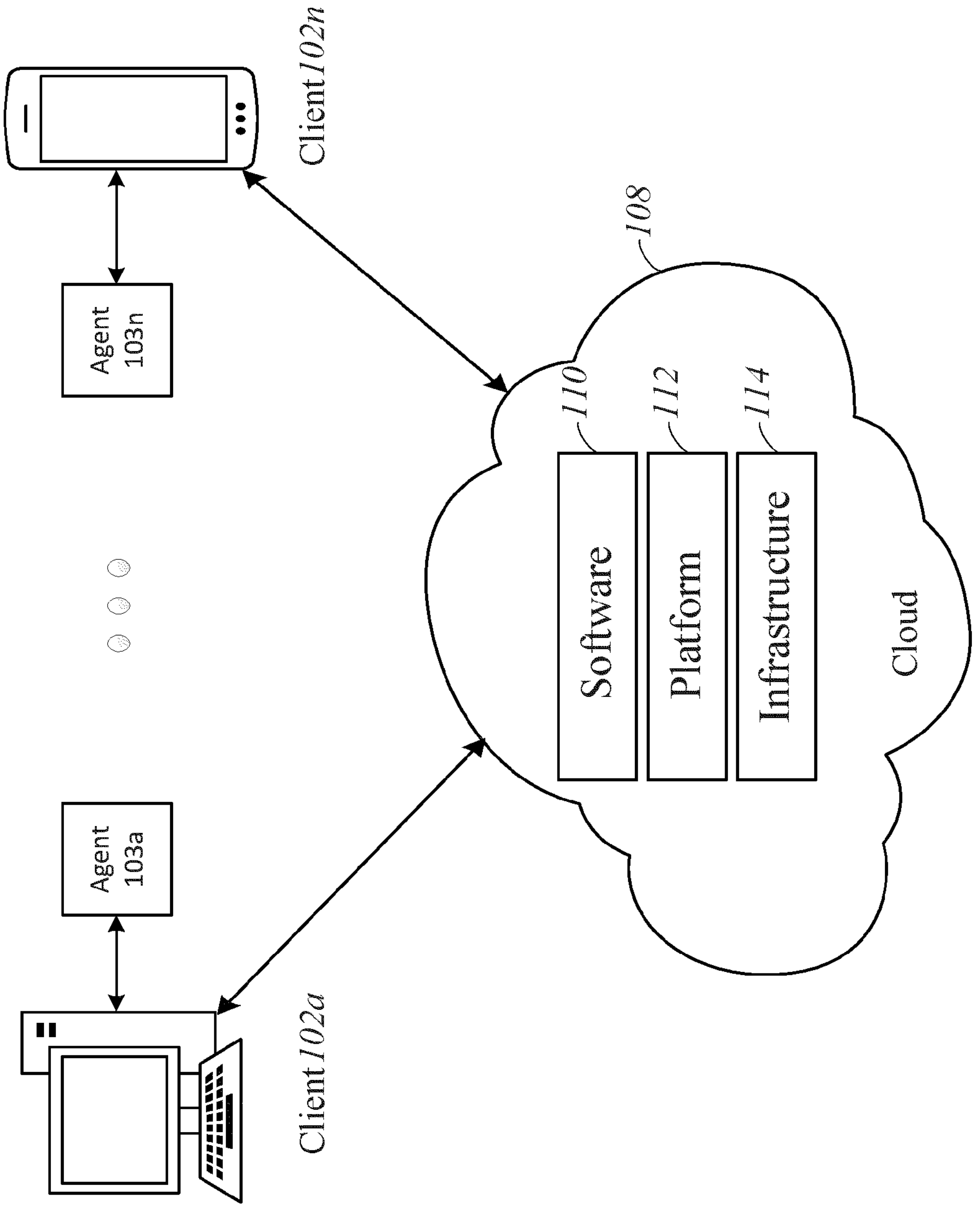
FIG. 1B is a block diagram depicting a cloud computing environment comprising a client device in communication with cloud service providers.

Referring to FIG. 1B, a cloud computing environment is depicted for managing network communication sessions of network applications. A cloud computing environment may provide client 102 with one or more resources provided by a network environment. The cloud computing environment may include one or more clients 102*a*-102*n*, in communication with respective agents 103*a*-103*n* and with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms, or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds 108 may be connected to the servers 106 over a public network 104. Private clouds 108 may include private servers 106 that are physically maintained by clients 102 or owners of clients. Private clouds 108 may be connected to the servers 106 over a private network 104. Hybrid clouds 108 may include both the private and public networks 104 and servers 106.

The cloud 108 may also include a cloud based delivery, e.g., Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington; RACKSPACE CLOUD provided by Rackspace US, Inc., of San Antonio, Texas; Google Compute Engine provided by Google Inc. of Mountain View, California; or RIGHTSCALE provided by RightScale, Inc., of Santa Barbara, California. PaaS providers may offer functionality provided by IaaS, including, e.g., storage, networking, servers, or virtualization, as well as additional resources such as, e.g., the operating system, middleware, or runtime resources. Examples of PaaS include WINDOWS AZURE provided by Microsoft Corporation of Redmond, Washington; Google App Engine provided by Google Inc.; and HEROKU provided by Heroku, Inc., of San Francisco, California. SaaS providers may offer the resources that PaaS provides, including storage, networking, servers, virtualization, operating system, middleware, or runtime resources. In some implementations, SaaS providers may offer additional resources, including, e.g., data and application resources. Examples of SaaS include GOOGLE APPS provided by Google Inc.; SALESFORCE provided by Salesforce.com Inc. of San Francisco, California; or OFFICE 365 provided by Microsoft Corporation. Examples of SaaS may also include data storage providers, e.g., DROPBOX provided by Dropbox, Inc., of San Francisco, California; Microsoft SKYDRIVE provided by Microsoft Corporation; Google Drive provided by Google Inc.; or Apple ICLOUD provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages, including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g., GOOGLE CHROME, Microsoft INTERNET EXPLORER, or Mozilla Firefox provided by Mozilla Foundation of Mountain View, California). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some implementations, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
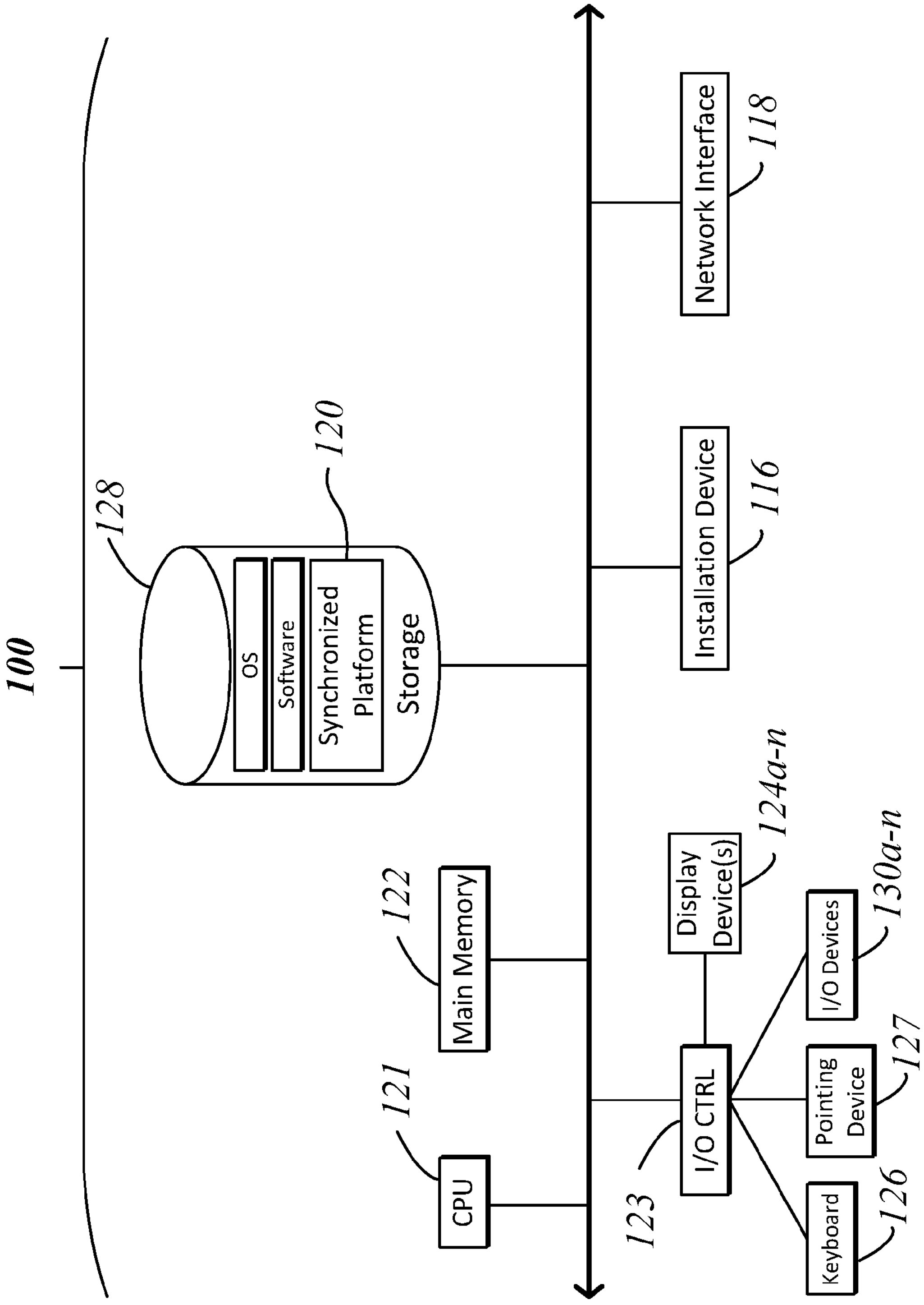
FIGS. 1C and 1D are block diagrams depicting embodiments of computing devices useful in connection with the methods and systems described herein.
Figure 1D:
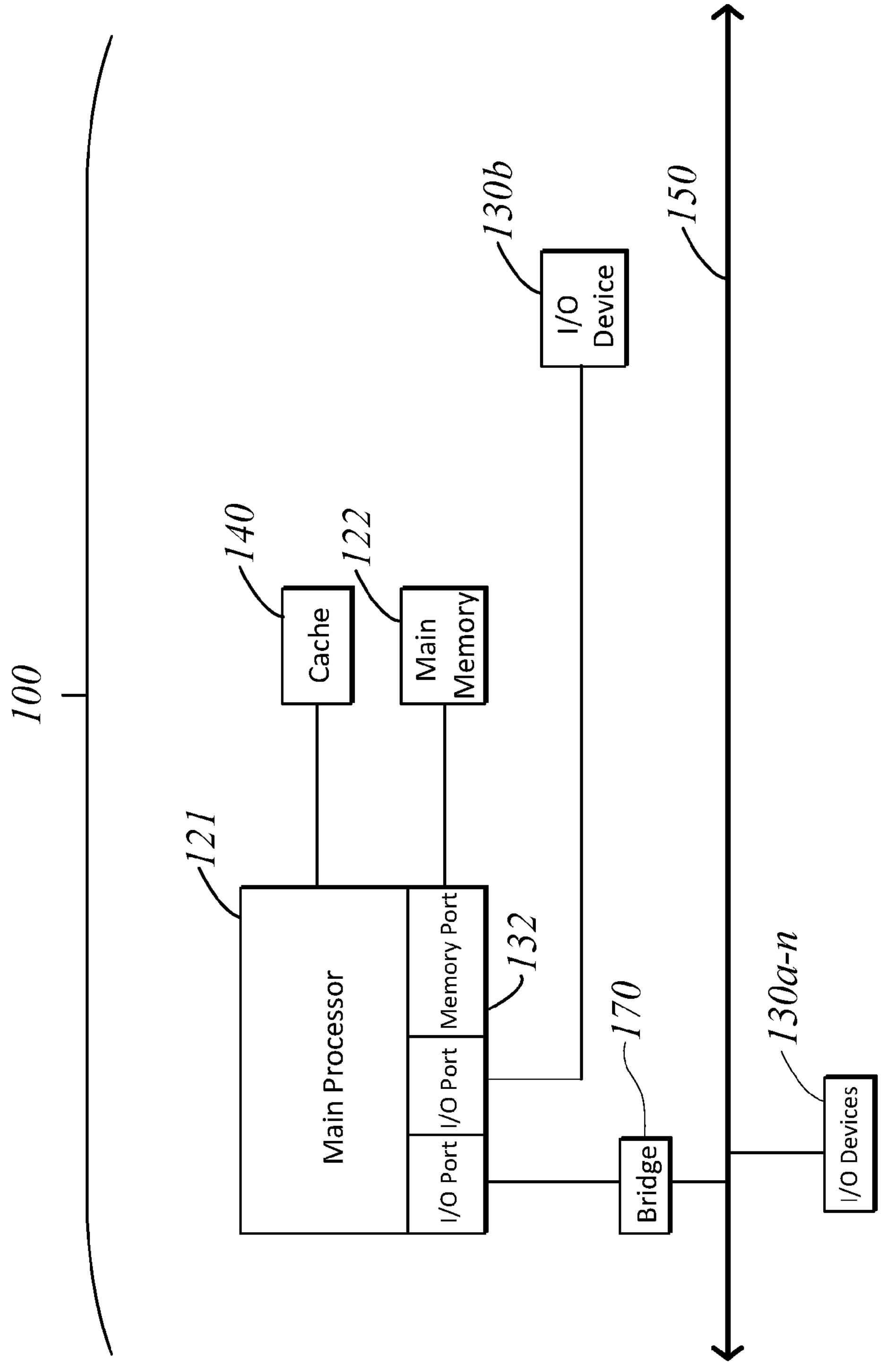

The client 102 and server 106 may be deployed as and/or executed on any type and form of computing device, e.g., a computer, network device or appliance capable of communicating on any type and form of network and performing the operations described herein. FIGS. 1C and 1D depict block diagrams of a computing device 100 useful for practicing an implementation of the client 102 or a server 106, for managing network communication sessions of network applications. As shown in FIGS. 1C and 1D, each computing device 100 includes a central processing unit 121 and a main memory unit 122. As shown in FIG. 1C, a computing device 100 may include a storage device 128, an installation device 116, a network interface 118, an I/O controller 123, display devices 124*a*-124*n*, a keyboard 126, and a pointing device 127, e.g., a mouse. The storage device 128 may include, without limitation, an operating system, software, and synchronized platform 120, which can implement any of the features of the data processing system 205 described herein below in conjunction with FIG. 2. As shown in FIG. 1D, each computing device 100 may also include additional optional elements, e.g., a memory port 132, a bridge 170, one or more input/output devices 130*a*-130*n* (generally referred to using reference numeral 130), and a cache memory 140 in communication with the central processing unit 121.

The central processing unit 121 is any logic circuitry that responds to and processes instructions fetched from the main memory unit 122. In many implementations, the central processing unit 121 is provided by a microprocessor unit, e.g., those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of a multi-core processors include the AMD PHENOM IIX2, INTEL CORE i5, INTEL CORE i7, and INTEL CORE i9.

Main memory unit 122 may include one or more memory chips capable of storing data and allowing any storage location to be directly accessed by the microprocessor 121. Main memory unit 122 may be volatile and faster than storage 128 memory. Main memory units 122 may be dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some implementations, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the implementation shown in FIG. 1C, the processor 121 communicates with main memory 122 via a system bus 150 (described in more detail below). FIG. 1D depicts an implementation of a computing device 100 in which the processor communicates directly with main memory 122 via a memory port 132. For example, in FIG. 1D the main memory 122 may be DRDRAM.

FIG. 1D depicts an implementation in which the main processor 121 communicates directly with cache memory 140 via a secondary bus, sometimes referred to as a backside bus. In other implementations, the main processor 121 communicates with cache memory 140 using the system bus 150. Cache memory 140 typically has a faster response time than main memory 122 and is typically provided by SRAM, BSRAM, or EDRAM. In the implementation shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For implementations in which the I/O device is a video display 124, the processor 121 may use an Advanced Graphics Port (AGP) to communicate with the display 124 or the I/O controller 123 for the display 124. FIG. 1D depicts an implementation of a computer 100 in which the main processor 121 communicates directly with I/O device 130*b* or other processors 121' via HYPERTRANSPORT, RAPIDIO, or INFINIBAND communications technology. FIG. 1D also depicts an implementation in which local busses and direct communication are mixed: the processor 121 communicates with I/O device 130*a* using a local interconnect bus 150 while communicating with I/O device 130*b* directly.

A wide variety of I/O devices 130*a*-130*n* may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex cameras (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130*a*-130*n* may include a combination of multiple input or output devices, including, e.g., Microsoft KINECT, Nintendo Wiimote for the WII, Nintendo WII U GAMEPAD, or Apple IPHONE. Some devices 130*a*-130*n* allow gesture recognition inputs through combining some of the inputs and outputs. Some devices 130*a*-130*n* provide for facial recognition which may be utilized as an input for different purposes including authentication and other commands. Some devices 130*a*-130*n* provides for voice recognition and inputs, including, e.g., Microsoft KINECT, SIRI for IPHONE by Apple, Google Now, or Google Voice Search.

Additional devices 130*a*-130*n* have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality, including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130*a*-130*n*, display devices 124*a*-124*n* or group of devices may be augmented reality devices. The I/O devices 130*a*-130*n* may be controlled by an I/O controller 123 as shown in FIG. 1C. The I/O controller 123 may control one or more I/O devices 130*a*-130*n*, such as, e.g., a keyboard 126 and a pointing device 127, e.g., a mouse or optical pen. Furthermore, an I/O device 130 may also provide storage and/or an installation medium 116 for the computing device 100. In still other implementations, the computing device 100 may provide USB connections (not shown) to receive handheld USB storage devices. In further implementations, an I/O device 130 may be a bridge between the system bus 150 and an external communication bus, e.g., a USB bus, a SCSI bus, a FireWire bus, an Ethernet bus, a Gigabit Ethernet bus, a Fibre Channel bus, or a Thunderbolt bus.

In some implementations, display devices 124*a*-124*n* may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g., stereoscopy, polarization filters, active shutters, or autostereoscopic. Display devices 124*a*-124*n* may also be a head-mounted display (HMD). In some implementations, display devices 124*a*-124*n* or the corresponding I/O controllers 123 may be controlled through or have hardware support for OPENGL or DIRECTX API or other graphics libraries.

In some implementations, the computing device 100 may include or connect to multiple display devices **124*a*-124*n*, which each may be of the same or different type and/or form. As such, any of the I/O devices 130*a*-130*n* and/or the I/O controller 123 may include any type and/or form of suitable hardware, software, or combination of hardware and software to support, enable or provide for the connection and use of multiple display devices 124*a*-124*n* by the computing device 100. For example, the computing device 100 may include any type and/or form of video adapter, video card, driver, and/or library to interface, communicate, connect, or otherwise use the display devices 124*a*-124*n*. In one implementation, a video adapter may include multiple connectors to interface to multiple display devices 124*a*-124*n*. In other implementations, the computing device 100 may include multiple video adapters, with each video adapter connected to one or more of the display devices 124*a*-124*n*. In some implementations, any portion of the operating system of the computing device 100 may be configured for using multiple displays 124*a*-124*n*. In other implementations, one or more of the display devices 124*a*-124*n* may be provided by one or more other computing devices 100*a* or 100*b* connected to the computing device 100, via the network 104. In some implementations software may be designed and constructed to use another computer's display device as a second display device 124*a* for the computing device 100. For example, in one implementation, an Apple iPad may connect to a computing device 100 and use the display of the device 100 as an additional display screen that may be used as an extended desktop. One ordinarily skilled in the art will recognize and appreciate the various ways and implementations that a computing device 100 may be configured to have multiple display devices 124*a*-124*n***.

Referring again to FIG. 1C, the computing device 100 may comprise a storage device 128 (e.g., one or more hard disk drives or redundant arrays of independent disks) for storing an operating system or other related software, and for storing application software programs such as any program related to the synchronized platform 120. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via an I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software 110 can be run from a bootable medium, for example, a bootable CD, e.g., KNOPPIX, a bootable CD for GNU/Linux that is available as a GNU/Linux distribution from knoppix.net.

Client device 100 may also install software 110 or application from an application distribution platform 112. Examples of application distribution platforms 112 include the App Store for iOS provided by Apple, Inc.; the Mac App Store provided by Apple, Inc.; GOOGLE PLAY for Android OS provided by Google Inc.; Chrome Webstore for CHROME OS provided by Google Inc.; and Amazon Appstore for Android OS and KINDLE FIRE provided by Amazon.com, Inc. An application distribution platform 112 may facilitate installation of software 110 on a client device 102. An application distribution platform 112 may include a repository of applications on a server 106 or a cloud 108, which the clients **102*a*-102*n* may access over a network 104. An application distribution platform 112 may include an application developed and provided by various developers. A user of a client device 102 may select, purchase, and/or download an application via the application distribution platform 112**.

Furthermore, the computing device 100 may include a network interface 118 to interface to the network 104 through a variety of connections, including, but not limited to, standard telephone lines, LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one implementation, the computing device 100 communicates with other computing devices 100' via any type and/or form of gateway or tunneling protocol, e.g., Secure Socket Layer (SSL) or Transport Layer Security (TLS), or the Citrix Gateway Protocol manufactured by Citrix Systems, Inc., of Ft. Lauderdale, Florida. The network interface 118 may comprise a built-in network adapter, network interface card, PCMCIA network card, EXPRESSCARD network card, card bus network adapter, wireless network adapter, USB network adapter, modem, or any other device suitable for interfacing between the computing device 100 and any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to, WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Washington; MAC OS and iOS, manufactured by Apple, Inc., of Cupertino, California; and Linux, a freely-available operating system, e.g., Linux Mint distribution ("distro") or Ubuntu, distributed by Canonical Ltd. of London, United Kingdom; or Unix or other Unix-like derivative operating systems; and Android, designed by Google, of Mountain View, California, among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some implementations, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some implementations, the computing device 100 is a gaming system. For example, the computer system 100 may comprise a PLAYSTATION 3, a PLAYSTATION 4, PLAYSTATION 5, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, NINTENDO WII U, NINTENDO SWITCH, NINTENDO SWITCH 2 device manufactured by Nintendo Co., Ltd., of Kyoto, Japan, an XBOX 360, an XBOX ONE, an XBOX ONE S, an XBOX ONE X, an XBOX SERIES S, or an XBOX SERIES X, manufactured by the Microsoft Corporation of Redmond, Washington.

In some implementations, the computing device 100 is a digital audio player such as the Apple IPOD, IPOD Touch, and IPOD NANO lines of devices, manufactured by Apple Computer of Cupertino, California. Some digital audio players may have other functionality, including, e.g., a gaming system or any functionality made available by an application from a digital application distribution platform. For example, the IPOD Touch may access the Apple App Store. In some implementations, the computing device 100 is a portable media player or digital audio player supporting file formats, including, but not limited to, MP3, WAV, M4A/AAC, WMA Protected AAC, AIFF, Audible audiobook, Apple Lossless audio file formats and .mov,.m4v, and .mp4 MPEG-4 (H.264/MPEG-4 AVC) video file formats.

In some implementations, the computing device 100 is a tablet, e.g., the IPAD line of devices by Apple; GALAXY TAB family of devices by Samsung; or KINDLE FIRE, by Amazon.com, Inc., of Seattle, Washington. In other implementations, the computing device 100 is an eBook reader, e.g., the KINDLE family of devices by Amazon.com, or NOOK family of devices by Barnes & Noble, Inc., of New York City, New York.

In some implementations, the communications device 102 includes a combination of devices, e.g., a smartphone combined with a digital audio player or portable media player. For example, one of these implementations is a smartphone, e.g., the IPHONE family of smartphones manufactured by Apple, Inc.; a Samsung GALAXY family of smartphones manufactured by Samsung, Inc.; or a Motorola DROID family of smartphones. In yet another implementation, the communications device 102 is a laptop or desktop computer equipped with a web browser and a microphone and speaker system, e.g., a telephony headset. In these implementations, the communications devices 102 are web-enabled and can receive and initiate phone calls. In some implementations, a laptop or desktop computer is also equipped with a webcam or other video capture device that enables video chat and video call.

In some implementations, the status of one or more machines 102, 106 in the network 104 are monitored, generally as part of network management. In one of these implementations, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these implementations, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods for Configurable Timer For Processing Network Messages In Queued Processing Environments This disclosure relates to techniques for implementing configurable timers for processing network messages in queued processing environments. Data processing systems can receive and process operation requests from multiple external computing systems over a network. To coordinate the processing of operation requests, a data processing system can place incoming operation requests into a timed queue, such that each incoming operation request is subject to a delay period before the operation request is released for execution against available data records. The delay period can provide a window during which computing systems that have previously submitted requests to generate data records on the data processing system can modify or remove the data records. Various computing systems, such as market computing systems, can submit requests to the data processing system to generate data records corresponding to events, and the data records can remain available for execution based on subsequent operation requests (e.g., from client devices operated by end-users). The data processing system can maintain a queue of incoming operation requests and a set of timers that track elapsed time for each queued operation request, and the data processing system can release/process each operation request for execution once the corresponding timer satisfies a predetermined delay threshold.

However, conventional approaches to timed queuing apply a single, uniform delay period to all incoming operation requests, regardless of the configurations of the computing systems that generated the data records against which the operation requests may be executed. The uniform delay period can be set at a value that accommodates the slowest-responding computing systems in the network, which can result in unnecessary latency for computing systems that are prepared to accept execution of operation requests after a shorter delay. Due to their fixed timing characteristics, existing timed/priority queuing approaches cannot implement approaches for computing systems to specify, on a per-data-record basis, a configured delay period for incoming operation requests that may be executed with respect to the data records of the computing systems. Such uniform delays reduce the overall responsiveness of data processing with respect to operation requests and can prevent efficient allocation of computing resources to data records based on the timing configurations of the computing systems that generated the data records.

The techniques described herein provide configurable timer functionality for processing network messages (e.g., received operation requests) in queued processing environments, such that individual computing systems can specify, on a per-request basis, a latency parameter that indicates a minimum processing delay for operation requests directed to data records generated/requested by the computing systems. In one example, the data processing system can receive the latency parameter as a field within a request message from each computing system and can store the latency parameter in association with the corresponding data record. When an incoming operation request is received and queued, the data processing system can evaluate the latency parameters associated with eligible data records according to stored processing policies and can prioritize execution of the operation request with respect to data records having shorter specified latency parameters before executing with respect to data records having longer or default latency parameters.

To implement the configurable timer functionality, the data processing system can receive requests from multiple computing systems to generate data records corresponding to an event. Each request can include a latency parameter that may differ from request to request. The data processing system can generate each data record in association with the corresponding latency parameter. When the data processing system receives an incoming operation request corresponding to the event, the data processing system can initiate a timer corresponding to receipt of the operation request. The data processing system can determine whether the operation request is executable against one or more data records according to an execution policy for incoming operation requests (e.g., whether any data records are eligible to execute the operation request based on the parameters thereof).

If the operation request is executable, the data processing system can rank/select/filter the eligible data records according to the latency parameters and can release the operation request for execution with respect to the highest-ranked data record once the timer satisfies the latency parameter of the highest-ranked data record. If the operation request is only partially executed with respect to the highest-ranked data record, the data processing system can maintain the timer and repeat the ranking and selection process for the remaining quantity of the operation request against subsequent eligible data records. In one example, a background timer process can run continuously on the data processing system to evaluate queued operation requests and flag each operation request for release when the corresponding timing condition is satisfied.

By providing per-data-record configurable latency parameters, the techniques described herein can reduce unnecessary processing delays for computing systems that specify shorter acceptable delay periods, while preserving the default delays for computing systems that do not specify a latency parameter. In doing so, the techniques described herein can improve execution responsiveness of operation requests received by the data processing system by facilitating earlier execution of operation requests against data records associated with shorter latency parameters, without modifying the underlying queue structure or default timing behavior for other data records. The ranking/selecting/filtering and iterative selection techniques described herein improve the efficiency of allocating partial operation request quantities across multiple data records having similar parameters, such that the data processing system can process operation requests with reduced idle time and reduced latency overall. The techniques described herein therefore provide technical improvements over conventional uniform-delay queuing approaches by enabling per-data-record timing differentiation at data record creation.

In various implementations, the techniques described herein can reduce processing and memory resource consumption. For example, a system that applies a uniform delay period to all incoming operation requests can expend processing cycles and memory resources maintaining timers and queue entries for the full duration of the uniform delay. By receiving, from a first computing system, a first request comprising a first latency parameter that specifies a first minimum processing delay, receiving, from a second computing system, a second request comprising a second latency parameter different from the first latency parameter, generating the first data record in association with the first latency parameter and the second data record in association with the second latency parameter, initiating a timer corresponding to receipt of an operation request, and executing the operation request with respect to the first data record based on determining that the timer satisfies the first latency parameter, the system can execute operation earlier than a uniform default delay would permit, thereby freeing processor cycles and memory allocations associated with maintaining queued operation requests for unnecessary durations. As a result, overall processing and memory resource consumption can be reduced by the system, both by virtue of the earlier release of operation requests from queues and the reduced duration over which the system maintains per-operation-request timer state and queue entry metadata in memory.

In various implementations, the techniques described herein can reduce network communication overhead by implementing per-data-record configurable latency parameters for processing operation requests. For example, a conventional system that processes all incoming operation requests under a single uniform delay period generates additional network traffic when computing systems transmit repeated modification or cancellation messages during an unnecessarily long delay window, and the system can transmit repeated status updates to client devices and computing systems while operation requests remain queued. By generating and processing different data records according to different latency parameters, the system can complete execution of operation requests at an earlier point in time relative to the uniform delay, thereby reducing the window during which computing systems transmit modification messages and during which the system transmits intermediate status communications over the network. As a result, the volume of network messages exchanged between the system, the computing systems, and/or client devices can be reduced, because earlier execution of the operation request shortens the period over which network-bound signaling and queue-state synchronization messages are transmitted.

Figure 2:
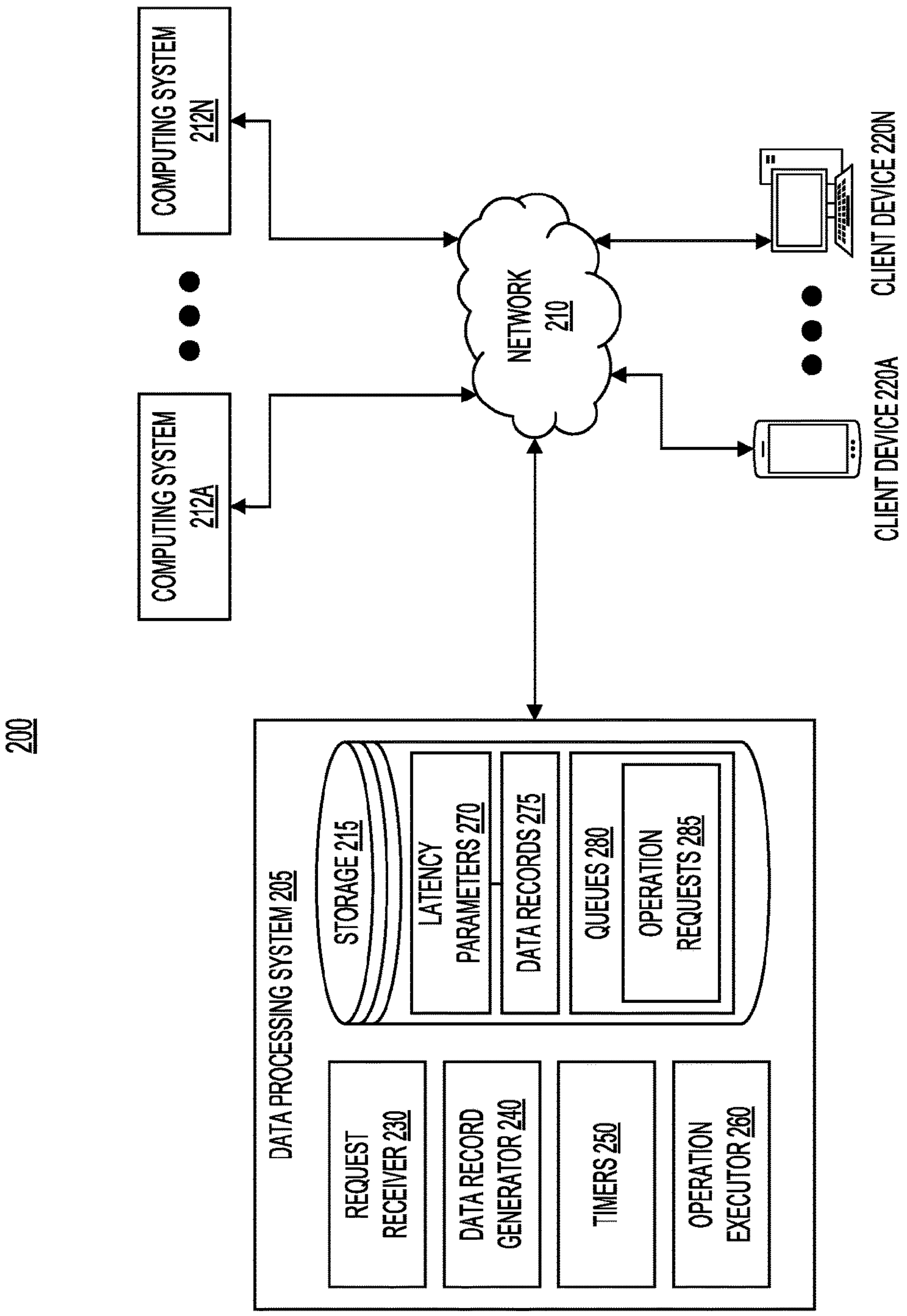
FIG. 2 is a block diagram of an example system for implementing configurable timers for processing network messages in queued processing environments, in accordance with one or more implementations.

Referring now to FIG. 2, illustrated is a block diagram of an example system 200 for implementing configurable timers for processing network messages in queued processing environments, in accordance with one or more implementations. The system 200 can include a data processing system 205, a network 210, one or more computing systems 212A-212N (sometimes generally referred to as "computing system(s) 212"), and one or more client devices 220A-220N (sometimes generally referred to as "client device(s) 220"). The data processing system 205 can include a request receiver 230, a data record generator 240, one or more timers 250, an operation executor 260, and a storage 215. The storage 215 can include one or more latency parameters 270, one or more data records 275, one or more queues 280, and one or more operation requests 285, among other data structures/information described herein.

Each of the components (e.g., the data processing system 205, the network 210, storage 215, the client devices 220, the computing systems 212, the storage 215, the request receiver 230, the data record generator 240, the timers 250, the operation executor 260, components thereof, etc.) of the system 200 can be implemented using the hardware components or a combination of software with the hardware components of a computing system, such as the server 106, the client computing system 102, or the computing system 100 described in connection with FIGS. 1A-1D, or any other computing system described herein.

The system 200 can be used to implement configurable timers for processing network messages in queued processing environments. In brief overview of the operations of the system 200, the data processing system 205 can receive, from one or more computing systems 212, requests to generate data records 275 corresponding to events, where each request can include a latency parameter 270 that specifies a minimum processing delay for operation requests 285 directed to the corresponding data record 275. The data processing system 205 can store each latency parameter 270 in the storage 215 in association with the corresponding data record 275. The request receiver 230 can receive incoming operation requests 285 from computing systems 212 and/or client devices 220 via the network 210, and the data processing system 205 can place each incoming operation request 285 into a queue 280. The timers 250 can track elapsed time for each queued operation request 285 relative to a time of receipt of the operation request 285. The operation executor 260 can determine whether a timer of the timers 250 satisfies at least one latency parameter 270 associated with one or more eligible data records 275, and can execute the operation request 285 with respect to a data record 275 based on the determination. The data record generator 240 can generate data records 275 in association with respective latency parameters 270 based on requests received from the computing systems 212. In some implementations, the operation executor 260 can rank/sort/filter eligible data records 275 at a given price value according to the respective latency parameters 270 and can execute the operation request 285 with respect to a highest-ranked data record 275 once the corresponding timer of the timers 250 satisfies the latency parameter 270 of the highest-ranked data record 275.

The data processing system 205 can include at least one processor and a memory (e.g., a processing circuit). The memory can store processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The data processing system 205 can include one or more computing devices or servers that can perform various functions as described herein. The data processing system 205 can include any or all of the components and perform any or all of the functions of the server 106, the client computing system 102, or the computing system 100 described in connection with FIGS. 1A-1D, or any other computing system described herein.

The network 210 can include computer networks such as the Internet, local, wide, metro or other area networks, intranets, satellite networks, other computer networks such as voice or data mobile phone communication networks, and combinations thereof. The data processing system 205 of the system 200 can communicate via the network 210, for example with one or more computing systems 212, one or more client devices 220, and/or one or more information sources, such as web servers or external databases, among others. The network 210 may be any form of computer network that can relay information between the data processing system 205, the one or more computing systems 212, the one or more client devices 220, and one or more information sources, such as web servers or external databases, amongst others. In some implementations, the network 210 may include the Internet and/or other types of data networks, such as a local area network (LAN), a wide area network (WAN), a cellular network, a satellite network, or other types of data networks.

The network 210 may also include any number of computing devices (e.g., computers, servers, routers, network switches, etc.) that can receive and/or transmit data within the network 210. The network 210 may further include any number of hardwired and/or wireless connections. Any or all of the computing devices described herein (e.g., the data processing system 205, the one or more computing systems 212, the one or more client devices 220, etc.) may communicate wirelessly (e.g., via Wi-Fi, cellular, radio, etc.) with a transceiver that is hardwired (e.g., via a fiber optic cable, a CAT5 cable, etc.) to other computing devices in the network 210. Any or all of the computing devices described herein (e.g., the data processing system 205, the one or more computing systems 212, the one or more client devices 220, the server 106, the client computing system 102, the computing system 100, etc.) may also communicate wirelessly with the computing devices of the network 210 via a proxy device (e.g., a router, network switch, or gateway).

Each client device 220 can include at least one processor and a memory, e.g., a processing circuit. The memory can store processor-executable instructions that, when executed by processor, cause the processor to perform one or more of the operations described herein. The processor can include a microprocessor, an ASIC, an FPGA, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language. The client device 220 can include one or more computing devices or servers that can perform various functions as described herein. The client device 220 can include any or all of the components and perform any or all of the functions of the client computing system 102 or the computing system 100 described in connection with FIGS. 1A-1D, or any other computing system described herein.

The client device 220 may execute one or more applications (e.g., web-based applications, native applications, etc.) to perform any of the operations described herein. The system 200 may include any number of client devices 220 that may perform any of the operations described herein.

Each client device 220 can include, but is not limited to, a mobile device (e.g., a smartphone, tablet, etc.), a television device (e.g., smart television, set-top box, etc.), a personal computing device (e.g., a desktop, a laptop, etc.) or another type of computing device. Each client device 220 can be implemented using hardware or a combination of software and hardware. Each client device 220 can include a display or display portion. The display can include a display portion of a television, a display portion of a computing device, or another type of interactive display (e.g., a touchscreen, a display, etc.) and one or more input/output (I/O) devices (e.g., a mouse, a keyboard, digital keypad). The display can include one or more portions, for example, to display various graphical user interfaces as described herein. The display can include a touch screen displaying an application, such as the applications described herein. The display can include a border region (e.g., side border, top border, bottom border).

In some implementations, the display can include a touch screen display, which can display graphical content. The display can receive interactions from a user. The interactions can result in interaction data, which can be stored and transmitted by the processing circuitry of the client device 220. The interaction data can include, for example, interaction coordinates, an interaction type (e.g., click, swipe, scroll, tap, etc.), and an indication of an actionable object with which the interaction occurred. Each client device 220 can include an input device that enables a user to select one or more actionable objects as described herein. For example, a touchscreen display can enable interaction with one or more visual indications provided through the display of each client device 220, and responsive to an interaction (e.g., select, click-on, touch, hover), the client device 220 can generate an indication identifying the interaction, the selection, or an indication of a command, among others. The touchscreen display can depict graphical elements representing an action query and generate an indication of the action chosen by the user. In some implementations, interactions received at the client device 220 can cause the client device 220 and/or the application executing thereon to transmit one or more requests, messages, signals, or other data as described in further detail herein.

Each client device 220 can include a device identifier, which can be specific to each respective client device 220. The device identifier can include a script, code, label, or marker that identifies a particular client device 220. In some implementations, the device identifier can include a string or plurality of numbers, letters, characters or any combination numbers, letters, and characters. In some implementations, each client device 220 can have a unique device identifier. Each client device 220 can include a client application, which can be an application that communicates with the data processing system 205 to transmit operation requests 285 to the data processing system 205 via the network 210 and to receive indications of executed operation requests 285 from the data processing system 205, as described in further detail herein.

The application can include a web application, a server application, a resource, a desktop, or a file. In some implementations, the application can include a local application (e.g., local to a client device 220), hosted application, Software as a Service (SaaS) application, virtual application, mobile application, and other forms of content. In some implementations, the application can include or correspond to applications provided by remote servers or third-party servers. In some implementations, the application can access the network profiles, available data records 275, information relating to queues 280, timers 250, information relating to pending or executed operation requests 285, and/or any other information described herein. The application can generate one or more actionable objects (e.g., interactive user interface elements) as described herein, to a player through a client device 220. Such actionable objects can include player-selectable hyperlinks, buttons, graphics, videos, images, or any other type of user interface element that generate a signal that is processed by the application executing on the respective client device 220.

In some implementations, one or more client devices 220 can establish one or more network sessions with the data processing system 205. In some implementations, the one or more network sessions can each include a channel or connection between the data processing system 205 and the one or more client devices 220. In some implementations, the one or more client devices 220 can transmit a request to join a communication session of the network sessions. The network sessions can include the execution of a virtual application or web-based application, in which one or more client devices 220 can communicate with the data processing system 205 according to protocol of the virtual or web-based application. The protocol of the virtual or web-based application can include, but are not limited to, rules and/or instructions associated with the virtual or web-based application (e.g., an interactive network application, submitting operation requests 285, browsing/accessing available events and/or data records 275 or information/categories associated therewith, etc.). The network session may be used to perform any of the operations described herein. Any of the operations of the virtual or web-based application may sometimes be executed by the client device 220, by the data processing system 205, or a combination thereof.

In some implementations, the one or more network sessions can be or include one or more application sessions (e.g., of the virtual or web-based application), an execution session, a desktop session, a hosted desktop session, a terminal services session, a browser session, a remote desktop session, a URL session and/or a remote application session, among others. Each network session can include encrypted and/or secure sessions, which can include an encrypted file, encrypted data or traffic. Each client device 220 can use the network session established with the data processing system 205 to carry out any of the functionalities described herein. For example, the application executing on each client device 220 can perform any of the client-side operations described herein, including displaying any of the user interfaces as described herein, or any other types of user interfaces described herein.

Each of the client devices 220 can be computing devices that can communicate via the network 210 to access information resources, such as web pages via a web browser, or application resources via a native application executing on a client device 220. When accessing information resources (e.g., instructions/assets for displaying/presenting, modifying, or otherwise navigating graphical user interface(s), etc.) the client device 220 can execute instructions (e.g., embedded in the native applications, in the information resources, etc.) that cause the client devices 220 to display various application interfaces, such as the user interfaces described herein. The application interfaces can be, for example, application interfaces that present different types of available live events, data records 275 and/or information/categories associated therewith, operation request 285 statuses, and/or other types of interactive graphical user interfaces. In general, the graphical user interfaces may include various different types of interactive or non-interactive assets (e.g., images, video, animations, graphics, audio, etc.) that can be presented to a user via the input/output interfaces of a client device 220.

In operation, the client devices 220 can transmit operation requests 285 to the data processing system 205 via the network 210. Each client device 220 can execute an application that presents one or more graphical user interfaces displaying available events and/or data records 275 maintained by the data processing system 205. A user of a client device 220 can provide an input via the graphical user interface to submit an operation request 285 that specifies one or more parameters, such as a price, a quantity, and/or an indication of an event to which the operation request 285 corresponds. The application executing on the client device 220 can transmit the operation request 285 to the data processing system 205 via the network 210. The data processing system 205 can receive the operation request 285 via the request receiver 230 and can place the operation request 285 into one or more queues 280. The data processing system 205 can transmit, to the client device 220 via the network 210, an acknowledgment indicating receipt of the operation request 285. Upon execution of the operation request 285 by the operation executor 260 (as described in further detail herein), the data processing system 205 can transmit, to the client device 220, an indication that the operation request 285 has been executed with respect to one or more data records 275, including an indication of the quantity executed and/or the price at which execution occurred.

For example, a player of a client device 220 can select, via the graphical user interface, an event for which one or more data records 275 are available (e.g., at a given/specified price value, at a certain time window/range, in association with a corresponding category, etc.). The player can provide, via input fields of the graphical user interface, one or more parameters for an operation request 285, such as a side, a desired quantity, and/or a price. The player can select an actionable object (e.g., a submit button, a confirmation element, etc.) presented within the graphical user interface to initiate transmission of the operation request 285. The client device 220 can transmit the operation request 285 to the data processing system 205 that specifies the event, the desired quantity, and the price. The data processing system 205 can queue the operation request 285 in a queue 280 and can initiate a timer of the timers 250 corresponding to receipt of the operation request 285. While the operation request 285 remains in the queue 280, the data processing system 205 may not transmit information about the queued operation request 285 to other client devices 220 or computing systems 212. Once the timer of the timers 250 satisfies a latency parameter 270 associated with an eligible data record 275, the operation executor 260 can execute the operation request 285 with respect to the eligible data record 275, and the data processing system 205 can transmit an execution confirmation to the client device 220 indicating the executed quantity and/or the corresponding data record 275.

The computing systems 212 can be computing devices operated by entities that generate and maintain data records 275 on the data processing system 205. For example, each computing system 212 can be a market computing system operated by a market maker that submits requests to the data processing system 205 to generate data records 275 (e.g., orders/quotes to buy or sell units of event contracts as described in further detail herein) corresponding to one or more events. Each computing system 212 can transmit requests to the data processing system 205 via the network 210 using one or more application programming interfaces (APIs) exposed by the data processing system 205. The API(s) exposed by the data processing system 205 can accept request messages that specify one or more parameters for generating a data record 275, such as an identifier of the event or event contract, a side parameter, a quantity parameter, a price parameter, and/or a latency parameter 270, among others.

The side parameter can indicate a direction of the data record 275 (e.g., a buy side or a sell side). The quantity parameter can indicate a number of units of an event contract associated with the data record 275. The price parameter can indicate a price value at which the data record 275 is to be made available for execution against operation requests 285. The latency parameter 270 can indicate a minimum processing delay (e.g., a speed bump delay) that the computing system 212 specifies for incoming operation requests 285 directed to the corresponding data record 275, as described in further detail herein. Each request message can include the latency parameter 270 as a dedicated field within the request message. In some implementations, the request message can conform to a standard message protocol corresponding to the API(s). For example, the request message can conform to a protocol message format associated with the data processing system 205 (e.g., an exchange protocol format), and the latency parameter 270 can be encoded as a dedicated tag within the protocol message. In some implementations, a computing system 212 can omit the latency parameter 270 from a request message, in which case the data processing system 205 can assign a default latency parameter (e.g., a default delay defined by the exchange) to the corresponding data record 275.

In various examples, each computing system 212 can register with and/or authenticate to the data processing system 205 prior to submitting requests to generate data records 275. The data processing system 205 can maintain, in the storage 215, registration information and/or authentication credentials associated with each computing system 212. In some implementations, each computing system 212 can access a graphical user interface provided by the data processing system 205 to view available events and/or event contracts, view existing data records 275, and/or submit requests to generate new data records 275. In some implementations, each computing system 212 can use the API exposed by the data processing system 205 programmatically, without a graphical user interface, to submit requests to generate, modify, and/or remove data records 275. For example, a computing system 212 can execute an automated process that monitors external data sources and transmits requests to the data processing system 205 to generate, modify, or cancel data records 275 based on changes detected in the external data sources. Each computing system 212 can specify different latency parameters 270 on different requests, such that a first request from a computing system 212 can include a first latency parameter 270 and a second request from the same computing system 212 can include a second latency parameter 270 different from the first latency parameter 270.

As an example use case, a first computing system 212 can transmit, to the data processing system 205 via the API, a first request to generate a first data record 275 corresponding to an event contract at a price of sixty dollars, a quantity of thirty units, and a latency parameter 270 of one second. A second computing system 212 can transmit, to the data processing system 205 via the API, a second request to generate a second data record 275 corresponding to the same event contract at a price of sixty dollars, a quantity of seventy units, and no specified latency parameter 270. The data processing system 205 can generate the first data record 275 in association with the latency parameter 270 of one second and can generate the second data record 275 in association with a default latency parameter (e.g., two seconds). The data processing system 205 can store both data records 275 and the respective latency parameters 270 in the storage 215. When the data processing system 205 receives an incoming operation request 285 corresponding to the event contract at the price of sixty dollars, the data processing system 205 can evaluate the latency parameters 270 associated with the first data record 275 and the second data record 275 to determine a prioritization order for execution of the operation request 285, as described in further detail herein.

The data processing system 205 can include at least one storage 215. The storage 215 can be a computer-readable memory that can store or maintain any of the information described herein. The storage 215 can maintain one or more data structures, which may contain, index, or otherwise store each of the values, pluralities, sets, variables, vectors, numbers, or thresholds described herein. The storage 215 can be accessed using one or more memory addresses, index values, or identifiers of any item, structure, or region maintained in the storage 215. The storage 215 can be accessed by the components of the data processing system 205, or any other computing device described herein, via the network 210. In some implementations, the storage 215 can be internal to the data processing system 205. In some implementations, the storage 215 can exist external to the data processing system 205 and may be accessed via the network 210. For example, the storage 215 may be distributed across many different computer systems (e.g., a cloud computing system) or storage elements and may be accessed via the network 210 or a suitable computer bus interface.

The data processing system 205 can store, in one or more regions of the memory of the data processing system 205, or in the storage 215, the results of any or all computations, determinations, selections, identifications, generations, constructions, or calculations in one or more data structures indexed or identified with appropriate values. Any or all values stored in the storage 215 may be accessed by any computing device described herein, such as the data processing system 205, to perform any of the functionalities or functions described herein. In implementations where the storage 215 forms a part of a cloud computing system, the storage 215 can be a distributed storage medium in a cloud computing system and can be accessed by any of the components of the data processing system 205, by the one or more client devices 220, by the one or more computing systems 212, and/or any other computing devices described herein, subject to access permissions for corresponding data stored/maintained in the storage 215.

The storage 215 can include one or more network profiles. The network profiles can include information associated with a user (sometimes referred to herein as a "player") of a client device 220. In some implementations, the network profiles may sometimes be referred to as "player profiles." A network profile of a player can be a user profile that includes information about the player and information about one or more of the client devices 220 used to access the data processing system 205 using the network profile. For example, identifiers of the network profile can be used to access the functionality of the data processing system 205 (e.g., by logging into/accessing functionality of the data processing system 205 via one or more web-based interfaces). The identifiers can include a username, a password, an e-mail address, a phone number, a personal identification number (PIN), a secret code-word, device identifiers for use in a two-factor authentication technique, among others.

The network profile can store information about placed operation requests 285 and/or data records 275 that are provided, placed, filled/executed, and/or selected by the player via requests transmitted to the data processing system 205. The network profile can store any information about the player, including a credit balance, operation request information (e.g., an amount of an operation request 285, a timestamp associated with an operation request 285, a client device identifier of a client device 220 that was used to place the operation request 285, any other operation-request-related signals or values described herein, etc.). The network profile can store information about a client device 220 used to access the data processing system 205 such as an IP address, a MAC address, a GUID, a network profile name (e.g., the name of a user of the client device 220, etc.), device name, among others. For example, the network profile can store location information determined based on interactions between each client device 220 and the data processing system 205. In some implementations, the network profile can be created by the data processing system 205 in response to a network profile creation request transmitted by a client device 220. The network profile creation request can include any of the network profile information described herein.

The network profiles can store indications of placed operation requests 285, including operation request status information (e.g., pending, filled, canceled, etc.) associated with each operation request 285. In some implementations, the network profiles can maintain associations between placed operation requests 285 and data records 275 that represent the filled/executed data records 275 and/or operation request 285 parameters selected by the player. The operation request status information can include details such as whether an operation request 285 is active, executed, or pending, the outcome of executed operation requests 285, and any quantities or prices associated with executed operation requests 285. The network profiles can store timestamps indicating when each operation request 285 was placed, queued, modified, or executed, which can indicate a chronological record of a player's activity on the data processing system 205 and/or automated processing activity involving the operation request 285. In some implementations, the network profiles can include identifiers and/or associations with specific events, data records 275, and/or computing systems 212 associated with each placed operation request 285.

The storage 215 can store/maintain one or more data records 275. Each data record 275 can represent an order or quote for a contract generated by the data processing system 205 in response to a request from a computing system 212 and corresponding to a particular event contract listed by an exchange. Each data record 275 can include one or more fields that specify attributes of the data record 275, such as an event identifier, a side parameter, a quantity parameter, a price parameter, a status indicator, a latency parameter 270, and/or a timestamp indicating a time at which the data record 275 was generated, among others. The event identifier can indicate a particular event or event contract to which the data record 275 corresponds. In some implementations, the event can be a sporting event, a financial market event, an entertainment event, an election event, a weather event, and/or an esports event, among others.

In some implementations, the event can correspond to a granular occurrence within a larger event, such as an individual play within a sporting contest, a single at-bat in a baseball game, a penalty kick in a soccer match, a free throw attempt in a basketball game, a serve in a tennis match, a specific down in a football game, a power play in a hockey game, a pit stop in an auto race, a round in a boxing or mixed martial arts bout, a corner kick, a goal-line stand, an individual hole in a golf tournament, a single lap of a race, a specific over in a cricket match, a dart throw in a darts competition, a frame in a snooker match, a possession sequence in a basketball game, and/or a specific map or round within an esports competition, among others. In some implementations, the event can correspond to a real-time occurrence that unfolds over a time window of seconds or fractions of a second, such as the outcome of a next pitch in a baseball game, the result of a next snap in a football game, whether a basketball shot attempt will be made or missed, the outcome of a specific penalty shootout kick, and/or whether a tennis serve will be an ace, among others.

Each data record 275 can be an order or a quote for an event contract provided by the data processing system 205. An event contract can be a financial instrument that corresponds to a particular outcome of a specified event, where the event contract pays out a predetermined value if the outcome occurs and pays out zero if the outcome does not occur. Each event contract can include one or more fields, such as an event identifier that specifies the event to which the event contract corresponds, an outcome description that specifies the particular outcome (e.g., a team winning a game, a player scoring a goal, a stock index closing above a threshold, etc.), a payout value, and/or an expiration time, among others. The data processing system 205 can generate and maintain event contracts in the storage 215 for one or more events, such as sporting events (e.g., football games, basketball games, baseball games, tennis matches, soccer matches, golf tournaments, auto races, hockey games, boxing bouts, mixed martial arts bouts, cricket matches, esports competitions, etc.), financial market events, entertainment events, election events, and/or weather events, among others. In some implementations, the event can correspond to a granular occurrence within a larger event, such as an individual play, a single at-bat, a penalty kick, a free throw attempt, a specific down, a power play, a pit stop, an individual hole, a single lap, a specific over, a dart throw, a frame, and/or a possession sequence, among others. Each data record 275 generated by the data record generator 240 can represent an order or quote to buy or sell a specified quantity of units of an event contract at a specified price value, and can include the latency parameter 270 as described herein.

In some implementations, event contracts may be generated via operators of the data processing system 205. In some implementations, event contracts may be generated in response to corresponding requests from computing systems 212 and/or client devices 220. The data processing system 205 can store each event contract in the storage 215 in association with an event identifier and one or more contract parameters, such as an outcome description, a payout value, and/or an expiration time, among others. Each event contract stored in the storage 215 can be available for the data record generator 240 to generate one or more data records 275 corresponding to the event contract in response to requests from the computing systems 212.

The side parameter can indicate a direction associated with the data record 275. For example, the side parameter can indicate a buy side or a sell side of the data record 275. In some implementations, the buy side can correspond to a position in which the computing system 212 that generated the data record 275 offers to back a particular outcome of the event (e.g., that a first play in a basketball game will be a three-point shot attempt, that a next pitch will be a strike, that a next snap will result in a passing play, etc.). In some implementations, the sell side can correspond to a position in which the computing system 212 that generated the data record 275 offers to lay against the particular outcome of the event (e.g., that the first play in the basketball game will not be a three-point shot attempt, that the next pitch will not be a strike, that the next snap will not result in a passing play, etc.).

The quantity parameter can indicate a number of units of the event contract available for execution against incoming operation requests 285. For example, the quantity parameter can indicate that fifty contract units are available at a specified price value of the data record 275. The price parameter can indicate a price value at which the data record 275 is available for execution. In some implementations, the price parameter can reflect a payout value and/or an implied likelihood associated with the outcome of the event to which the data record 275 corresponds. The latency parameter 270 can indicate a minimum processing delay (e.g., a speed bump delay) for incoming operation requests 285 directed to the data record 275, as described herein. For example, a data record 275 associated with a market maker order can include a latency parameter 270 specifying a configurable minimum delay (e.g., one second, one and a half seconds, two seconds, a microsecond interval, a nanosecond interval) that is acceptable to that order, relative to a default delay defined by the exchange.

The status indicator can indicate whether the data record 275 is open, closed, canceled, or partially executed. In some implementations, the status indicator can be updated to transition from open to partially executed in response to a partial fill of the quantity parameter of the data record 275, and can transition from partially executed to closed when a remaining quantity of the data record 275 reaches zero. Each data record 275 can include a timestamp indicating a time at which the data record 275 was generated by the data record generator 240 and/or a time at which the data record 275 became eligible for release from a latency queue. Each data record 275 can include a unique identifier for tracking the data record 275 across operations performed by the data processing system 205. Each data record 275 can be stored in one or more data structures in the storage 215, such as a table, a list, a tree, and/or a hash map, among others. Each data record 275 may be associated with a corresponding latency parameter 270 stored in the storage 215.

The data processing system 205 can generate each data record 275 based on a request received from a computing system 212 via the network 210. In some implementations, the data record generator 240 can populate the fields of a data record 275 based on parameters included in the request message from the computing system 212. For example, the data record generator 240 can set the event identifier, a contract/instrument specification identifier, the side parameter, the quantity parameter, the price parameter, and/or the latency parameter 270 of the data record 275 based on corresponding values specified in the request message. In some implementations, the data processing system 205 can update a data record 275 in response to a modification request received from the computing system 212 that generated the data record 275. The modification request can specify an updated quantity parameter, an updated price parameter, an updated latency parameter 270, and/or a cancellation indication, among others. The data processing system 205 can update the quantity parameter of the data record 275 in response to a partial execution of the data record 275 by the operation executor 260. In some implementations, the data processing system 205 can update the status indicator of the data record 275 from open to closed when the quantity parameter of the data record 275 reaches zero and can update the status indicator to canceled in response to a cancellation request.

The storage 215 can store/maintain one or more latency parameters 270 in association with corresponding data records 275. Each latency parameter 270 can represent a configurable value that specifies a minimum processing delay for incoming operation requests 285 directed to a corresponding data record 275. Each latency parameter 270 can include a time value expressed in a unit of time, such as seconds, milliseconds, and/or microseconds, among others. The latency parameter 270 can be stored in one or more data structures in the storage 215, such as a lookup table, an associative array, and/or an indexed data structure, among others, where each entry associates a latency parameter 270 with an identifier of a corresponding data record 275. In some implementations, the latency parameter 270 can include a parameter type indicator that distinguishes between a latency parameter 270 specified by a computing system 212 and a default latency parameter assigned by the data processing system 205. The default latency parameter can be a predetermined value maintained by the data processing system 205 and applied to any data record 275 for which no latency parameter 270 is specified in the corresponding request.

The data processing system 205 can generate and/or update each latency parameter 270 based on information received from a computing system 212. For example, the data record generator 240 can extract a latency parameter 270 from a dedicated field within a request message received from the computing system 212 and can store the latency parameter 270 in the storage 215 in association with the data record 275 generated from the request message. In some implementations, the data processing system 205 can assign the default latency parameter to a data record 275 when the request message from the computing system 212 omits the dedicated field for the latency parameter 270. In some implementations, a computing system 212 can transmit a modification request that includes an updated latency parameter 270 for an existing data record 275, and the data processing system 205 can replace the previously stored latency parameter 270 with the updated latency parameter 270 in the storage 215. Each latency parameter 270 can differ on a per-data-record basis, such that a first latency parameter 270 associated with a first data record 275 can specify a different time value than a second latency parameter 270 associated with a second data record 275.

The storage 215 can store/maintain one or more queues 280. Each queue 280 can represent a data structure that maintains an ordered collection of incoming operation requests 285 that are subject to a delay period before the operation requests 285 are released for execution. Each queue 280 can correspond to an event, a price value, and/or a category of operation requests 285, among others. Each queue 280 can include one or more entries, where each entry corresponds to a queued operation request 285 and includes associated metadata, such as a receipt timestamp, an identifier of the operation request 285, and/or a reference to a timer of the timers 250, among others. The receipt timestamp can indicate a time at which the data processing system 205 received the corresponding operation request 285 via the request receiver 230. Each queue 280 can be stored in one or more data structures in the storage 215, such as a first-in-first-out data structure, a priority data structure, and/or a linked list, among others.

The data processing system 205 can generate and/or update each queue 280 based on incoming operation requests 285 received via the network 210. For example, the request receiver 230 can place an incoming operation request 285 into a queue 280 corresponding to the event specified by the operation request 285, and the data processing system 205 can add an entry to the queue 280 that includes the receipt timestamp and the identifier of the operation request 285. In some implementations, the data processing system 205 can remove an entry from the queue 280 in response to execution of the corresponding operation request 285 by the operation executor 260. In some implementations, the data processing system 205 can remove an entry from the queue 280 in response to a cancellation request received from the computing system 212 and/or the client device 220 that submitted the operation request 285. The data processing system 205 can update the entries of a queue 280 in response to partial execution of an operation request 285, for example, by updating a remaining quantity associated with the entry in the queue 280.

The storage 215 can store/maintain one or more operation requests 285, for example, in one or more queues 280. Each operation request 285 can represent a request received by the data processing system 205 from a computing system 212 and/or a client device 220 to execute an operation with respect to one or more data records 275 corresponding to an event. Each operation request 285 can include one or more parameters, such as an event identifier, a side parameter, a quantity parameter, a price parameter, a source identifier indicating the computing system 212 and/or client device 220 from which the operation request 285 originated, and/or a receipt timestamp, among others. The event identifier can indicate the event to which the operation request 285 corresponds. The quantity parameter can indicate a number of units specified by the operation request 285 for execution. The price parameter can indicate a price value at which the operation request 285 seeks execution against one or more eligible data records 275. Each operation request 285 can be stored in one or more data structures in the storage 215, such as entries within a queue 280 and/or in a separate operation request log maintained by the data processing system 205.

The data processing system 205 can generate each operation request 285 based on a message received from a computing system 212 and/or a client device 220 via the network 210. For example, the request receiver 230 can receive an incoming message specifying the event identifier, the side parameter, the quantity parameter, and/or the price parameter, and the request receiver 230 can generate a corresponding operation request 285 in the storage 215 with the specified parameters. The request receiver 230 can assign the receipt timestamp to each operation request 285 based on a time at which the data processing system 205 received the incoming message. In some implementations, the data processing system 205 can update the quantity parameter of an operation request 285 in response to a partial execution of the operation request 285 by the operation executor 260, such that the quantity parameter reflects a remaining quantity of the operation request 285 that has not yet been executed. In some implementations, the data processing system 205 can update a status field of the operation request 285 to indicate whether the operation request 285 is pending, partially executed, or fully executed.

The timers 250 can track elapsed time for queued operation requests 285 relative to a time of receipt of each operation request 285 by the data processing system 205. Each timer of the timers 250 can correspond to a respective queued operation request 285 and can represent a timing state that indicates how much time has elapsed since the data processing system 205 received the operation request 285. Each timer of the timers 250 can include one or more fields, such as a timer identifier, a start timestamp, a target delay value, and/or a status indicator, among others. The timer identifier can associate the timer with a corresponding operation request 285 in a queue 280. The start timestamp can indicate a time at which the data processing system 205 received the corresponding operation request 285 via the request receiver 230. The target delay value can indicate a duration against which the elapsed time of the timer is to be compared, such as a latency parameter 270 associated with an eligible data record 275. The status indicator can indicate whether the timer is active, satisfied, or expired. Each timer of the timers 250 can be stored in one or more data structures in the storage 215, such as a timer table, a priority queue indexed by target delay value, and/or an associative array keyed by timer identifier, among others.

The data processing system 205 can generate each timer of the timers 250 in response to receipt of an incoming operation request 285 by the request receiver 230. For example, the data processing system 205 can create a new entry in the one or more data structures for the timers 250 and can populate the start timestamp field with a current system time corresponding to the time of receipt of the operation request 285. The data processing system 205 can update a timer of the timers 250 by calculating an elapsed time based on the start timestamp and a current time value. In some implementations, the data processing system 205 can execute a background timer process (e.g., a continuously running thread and/or loop) that periodically evaluates each active timer of the timers 250 and can update the status indicator of each timer from active to satisfied when the elapsed time meets or exceeds the target delay value. The data processing system 205 can remove a timer of the timers 250 from the one or more data structures in the storage 215 in response to execution of the corresponding operation request 285 by the operation executor 260. In some implementations, the data processing system 205 can maintain a timer of the timers 250 after a partial execution of the corresponding operation request 285, such that the timer remains active for comparison against additional latency parameters 270 associated with other eligible data records 275.

Referring now to the operations of the data processing system 205, the request receiver 230 can receive incoming requests from one or more computing systems 212 and/or client devices 220 via the network 210. The request receiver 230 can receive a first request from a first computing system 212A to generate a first data record 275 corresponding to an event, where the first request can include a first latency parameter 270 that specifies a first minimum processing delay for operation requests 285 directed to the first data record 275. The request receiver 230 can receive a second request from a second computing system 212N to generate a second data record 275 corresponding to the same event, where the second request can include a second latency parameter 270 different from the first latency parameter 270. The data record generator 240 can generate the first data record 275 in association with the first latency parameter 270 and can generate the second data record 275 in association with the second latency parameter 270. The data record generator 240 can store each data record 275 and the corresponding latency parameter 270 in the storage 215. In some implementations, the data record generator 240 can assign a default latency parameter to a data record 275 when the corresponding request from the computing system 212 omits a latency parameter 270. The data record generator 240 can populate the fields of each data record 275 based on parameters included in the corresponding request message, such as an event identifier, a side parameter, a quantity parameter, and/or a price parameter, among others.

The request receiver 230 can receive an incoming operation request 285 from a client device 220 and/or a computing system 212 via the network 210. The data processing system 205 can place the operation request 285 into at least one queue 280 and can initiate a timer of the timers 250 corresponding to receipt of the operation request 285. The timers 250 can track elapsed time for the operation request 285 relative to a receipt timestamp assigned by the request receiver 230. The operation executor 260 can determine whether the operation request 285 is executable against one or more data records 275 at a price specified by the operation request 285. In some implementations, the operation executor 260 can rank/sort/select/filter eligible data records 275 at the specified price according to the respective latency parameters 270 associated with the eligible data records 275. The operation executor 260 can execute the operation request 285 with respect to a highest-ranked (or selected/filtered) data record 275 once the timer of the timers 250 satisfies the latency parameter 270 of the highest-ranked data record 275. In some implementations, the operation executor 260 can determine that a remaining quantity of the operation request 285 exists after a partial execution with respect to the highest-ranked data record 275, and can maintain the timer of the timers 250 for comparison against latency parameters 270 of subsequent eligible data records 275. The operation executor 260 can repeat the ranking and execution process for the remaining quantity until the operation request 285 is fully executed or until no further eligible data records 275 remain at the specified price. Further details of the operations of the data processing system 205 are described in connection with FIG. 4.

Figure 3:
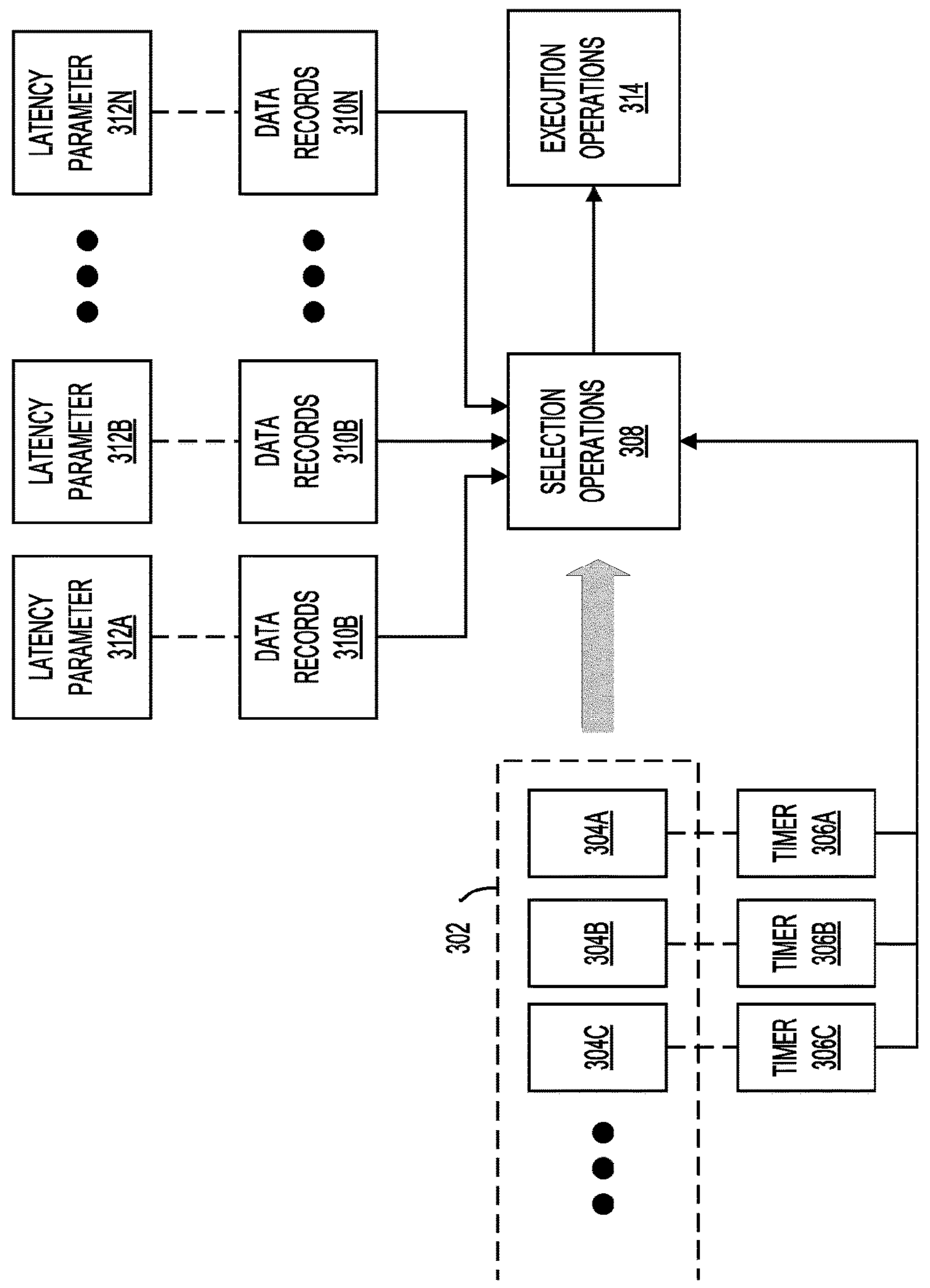
FIG. 3 is a dataflow diagram showing the selection and execution of requested operations based on latency parameters and operation-specific timers, in accordance with one or more implementations.

Referring now to FIG. 3, illustrated is a dataflow diagram 300 showing the selection and execution of requested operations based on latency parameters and operation-specific timers, in accordance with one or more implementations. The diagram 300 can include an operation queue 302, one or more operation requests 304A-304N (sometimes referred to herein as "operation request(s) 304"), one or more operation request timers 306A-306C (sometimes referred to herein as "operation request timer(s) 306"), selection operations 308, one or more data records 310A-310N, one or more latency parameters 312A-312N (sometimes referred to herein as "latency parameters(s) 312"), and execution operations 314.

The diagram 300 can illustrate an example dataflow for selecting and executing requested operations based on latency parameters 312 and operation-specific timers 306. The operation queue 302 can be a queue similar to the queue 280 of FIG. 2 and can maintain one or more operation requests 304 received by the data processing system 205 via the network 210. Each operation request 304 can be similar to an operation request 285 of FIG. 2 and can specify one or more parameters, such as an event identifier, a quantity parameter, and/or a price parameter, among others. Each operation request timer 306 can be similar to a timer of the timers 250 of FIG. 2 and can track elapsed time for a corresponding operation request 304 relative to a receipt timestamp assigned upon arrival at the data processing system 205. Each data record 310 can be similar to a data record 275 of FIG. 2 and can represent an order or quote generated in response to a request from a computing system 212. Each latency parameter 312 can be associated with a respective data record 310 and can specify a minimum processing delay for operation requests 304 directed to the respective data record 310.

In operation, the data processing system 205 can enqueue incoming operation requests 304 into the operation queue 302 and can initiate a respective operation request timer 306 for each operation request 304 upon receipt. The selection operations 308 can receive, as inputs, the operation requests 304 and the corresponding operation request timers 306 from the operation queue 302, and can receive, as additional inputs, the data records 310 and the associated latency parameters 312 from the storage 215. The selection operations 308 can determine, for each operation request 304 in the operation queue 302, whether the elapsed time indicated by the corresponding operation request timer 306 satisfies the latency parameter 312 of one or more eligible data records 310 at a price value specified by the operation request 304. The selection operations 308 can rank the eligible data records 310 according to the respective latency parameters 312 and can select a highest-ranked data record 310 for which the corresponding operation request timer 306 has satisfied the latency parameter 312 of the highest-ranked data record 310. As a result of the ranking/selecting/filtering performed by the selection operations 308, execution of operation requests 304 may occur in an order that differs from an arrival order of the operation requests 304, based on the latency parameters 312 associated with the eligible data records 310 and the elapsed times indicated by the respective operation request timers 306.

The execution operations 314 can use the selected operation request 304 matched to a corresponding data record 310 to execute the selected operation request 304 with respect to the corresponding data record 310. For example, the execution operations 314 can include filling at least a portion of a quantity specified by the selected operation request 304 against a quantity available in the corresponding data record 310. In some implementations, the execution operations 314 can update the quantity of the corresponding data record 310 to reflect a remaining quantity after the fill. In some implementations, the execution operations 314 can return an indication of a remaining quantity of the selected operation request 304 to the selection operations 308, such that the selection operations 308 can repeat the ranking and selection process for the remaining quantity against additional eligible data records 310 at the same price value. The execution operations 314 can update a status of the corresponding data record 310 from open to closed when the remaining quantity of the corresponding data record 310 reaches zero. Further details of the operations of the selection operations 308 and the execution operations 314 are described in connection with FIG. 4.

Figure 4:
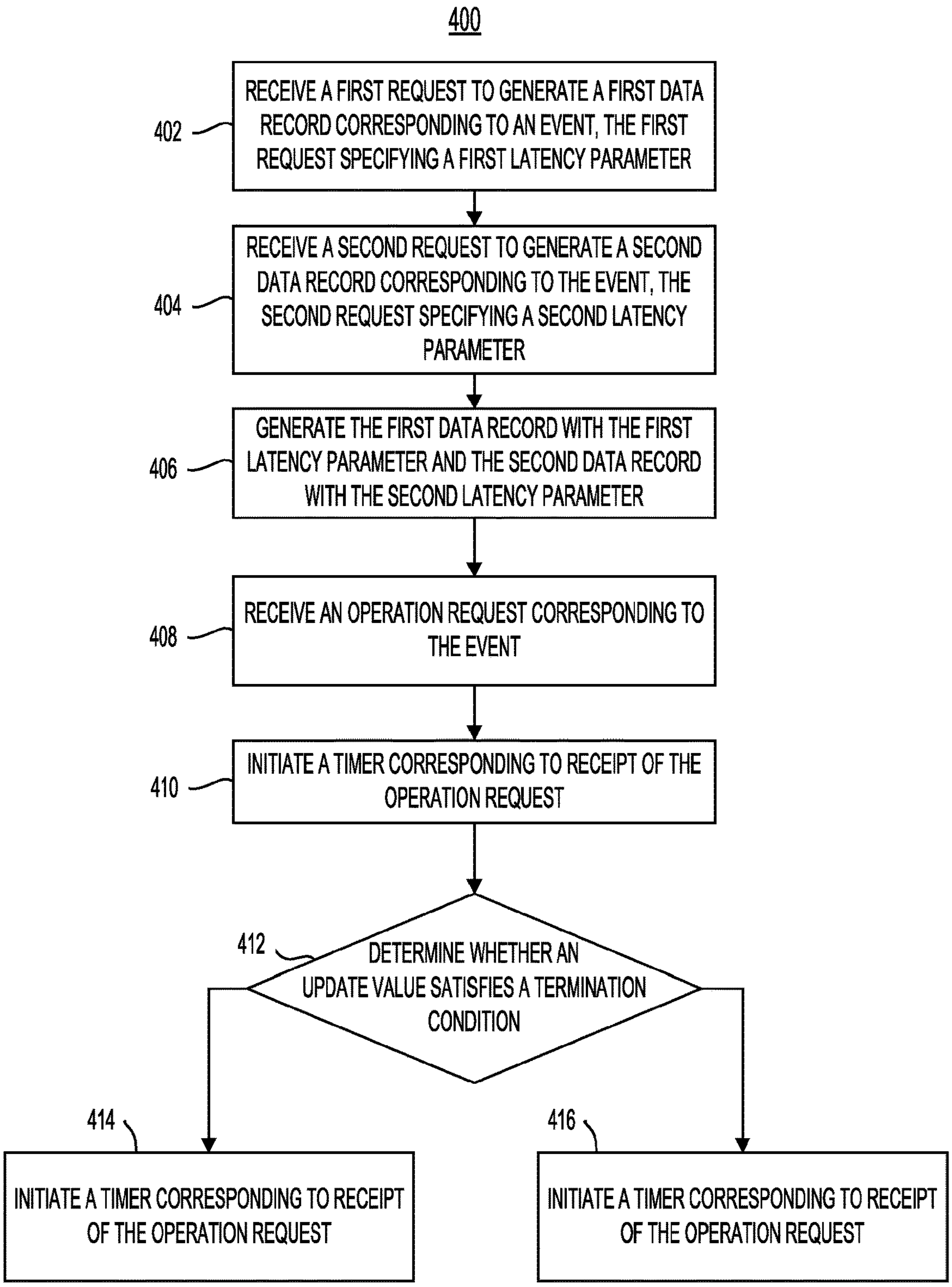
FIG. 4 is a flow chart of an example method for implementing configurable timers for processing network messages in queued processing environments, in accordance with one or more implementations.

Referring now to FIG. 4, illustrated is a method 400 of implementing configurable timers for processing network messages in queued processing environments. The method 400 is described as being performed by the data processing system 205 of FIG. 2. However, it should be understood that the method 400 may be performed using any computing device/system or combination of computing devices/systems described herein. Additional operations may be performed as part of the method 400 or operations of the method 400 may be omitted, in some implementations. In brief overview of the method 400, the method 400 can include receiving, from a first computing system, a first request to generate a first data record corresponding to an event, the first request specifying a first latency parameter (ACT 402), receiving, from a second computing system, a second request to generate a second data record corresponding to the event, the second request specifying a second latency parameter (ACT 404), generating the first data record with the first latency parameter and the second data record with the second latency parameter (ACT 406), receiving an operation request corresponding to the event (ACT 408), initiating a timer corresponding to receipt of the operation request (ACT 410), determining whether an update value satisfies a termination condition (ACT 412), and/or initiating a timer corresponding to receipt of the operation request based on the determination (ACT 414 or ACT 416).

The method 400, at ACT 402, can include receiving, from a first computing system, a first request to generate a first data record corresponding to an event. The first request can include a first latency parameter. The first latency parameter can be a configurable parameter that specifies a first minimum processing delay for operations identifying the event. The first computing system can be a market computing system (e.g., a first computing system 212A) that transmits the first request to the data processing system via a network (e.g., network 210). The first request can specify one or more parameters for generating the first data record, such as an event identifier, an event contract/instrument identifier, a side parameter, a quantity parameter, and/or a price parameter, among others. The first latency parameter can indicate a time value expressed in a unit of time, such as seconds, milliseconds, microseconds, and/or nanoseconds, among others. The data processing system can extract the first latency parameter from a field/tag within the first request. In some implementations, the first request can conform to a protocol message format associated with an API exposed by the data processing system. The data processing system can store the first latency parameter in association with an identifier of the first data record upon generation of the first data record at ACT 406.

The method 400, at ACT 404, can include receiving, from a second computing system, a second request to generate a second data record corresponding to the event. The data processing system can process requests to generate data records for the same event from multiple computing systems (e.g., multiple market makers). The second request can include a second latency parameter. The second latency parameter can specify a second minimum processing delay for operations identifying the second data record. The second latency parameter can be different from the first latency parameter. The second computing system can be a market computing system (e.g., computing system 212N) that is distinct from the first computing system. The second request can specify parameters for generating the second data record at a price value that may be the same as or different from the price value specified in the first request. The second latency parameter can indicate a time value that is greater than or less than the first latency parameter. For example, the first latency parameter can specify a delay of one second and the second latency parameter can specify a delay of one and a half seconds, or vice versa. In some implementations, the second computing system can omit the second latency parameter from the second request, in which case the data processing system can assign a default latency parameter to the second data record. The default latency parameter can be a predetermined delay value maintained by the data processing system and applied to any data record for which no latency parameter is specified in the corresponding request.

The data processing system may obtain requests to generate data records from any number of computing systems (e.g., any number of market makers). For example, in some implementations, the data processing system can receive, from a third computing system, a third request to generate a third data record. The third computing system can be a market computing system that is different from the first computing system and the second computing system. As with the first and second requests described in connection with ACTS 402 and 406, the third request can specify parameters for generating a third data record corresponding to the same event as the first data record and the second data record. The data processing system may apply default latency parameters when no latency parameter is specified in an operation request. In the example of the method 400 of FIG. 4, the "third request" can omit a latency parameter and its corresponding data record can be generated to include/assigned to a default latency parameter. For example, in some implementations, the third request can omit a latency parameter, in which case the data processing system can assign the default latency parameter to the third data record at ACT 406.

The method 400, at ACT 406, can include generating, based on the first request and the second request, the first data record (e.g., a first data record 275) in association with the first latency parameter and the second data record (e.g., a second data record 275) in association with the second latency parameter. The data processing system can allocate regions of memory to store the first and second data records, and can populate fields/data structures of the first and second data records based on parameters included in the first and requests, such as the event identifier, the side parameter, the quantity parameter, the price parameter, and/or the first latency parameter, among others. Each of the first data record and the second data record can represent an order or quote for an event contract corresponding to a particular outcome of the event.

The data processing system can store the first data record and the first latency parameter in a storage (e.g., storage 215) and can store the second data record and the second latency parameter in the storage. In some implementations, the data processing system can store, in association with the event and/or event contract/instrument, a data structure that identifies the first data record, the second data record, and their respective latency parameters and configuration settings. With respect to the third request described in connection with ACT 404, the data processing system can generate the third data record such that the third data record is assigned to the default latency parameter, and can store the third data record and the default latency parameter or an indication that the default latency parameter is to be used. Upon completion of ACT 406, the first data record, the second data record, and/or the third data record can be available as eligible data records for execution against subsequent operation requests received at ACT 408.

The method 400, at ACT 408, can include receiving an operation request (e.g., an operation request 285) corresponding to the event. The operation request can be a message received from a client device (e.g., client device 220) and/or a computing system via a network. The operation request can be an order for a specified event/event contract/contract instrument at a specified price. The operation request can specify one or more parameters, such as an event identifier, an event contract/instrument identifier, a side parameter, a quantity parameter, and/or a price parameter, among others. The event identifier of the operation request can correspond to the same event (and/or established event contract/instrument) for which the first data record and the second data record were generated at ACT 406. The price parameter of the operation request can indicate a price value at which the operation request seeks execution against one or more eligible data records. The data processing system can determine, based on the price parameter and the event identifier, whether one or more data records exist at the specified price value that are eligible for execution against the operation request. For example, the data processing system can access one or more data structures associated with the event and/or event contract/instrument to retrieve each data record that specifies a price parameter matching the price value indicated by the operation request, and that has a status indicator of open or partially executed. The data processing system can identify the first data record and the second data record as eligible data records when the price parameter of the operation request matches the price value specified by the first data record and the second data record.

In some implementations, the data processing system can evaluate the side parameter of the operation request against the side parameter of each retrieved data record to determine whether the operation request and the retrieved data record correspond to opposite sides of the event contract. For example, the data processing system can determine that a data record is eligible for execution against the operation request when the operation request specifies a buy side and the data record specifies a sell side at the same price value, or when the operation request specifies a sell side and the data record specifies a buy side at the same price value. In some implementations, the data processing system can evaluate the quantity parameter of each eligible data record to determine a total available quantity across the eligible data records at the specified price value. In some implementations, the data processing system can determine that no eligible data records exist at the specified price value, in which case the operation request can be queued/pending until corresponding data records are submitted to the data processing system.

In some implementations, the data processing system can queue the operation request in an operation queue (e.g., queue 280) corresponding to the event and/or event contract/instrument. The operation queue can maintain an ordered collection of incoming operation requests that are each subject to a delay period before the operation requests are released for execution. The data processing system can add an entry to the operation queue that corresponds to the operation request and that includes metadata associated with the operation request, such as the event identifier, the price parameter, the quantity parameter, and/or a receipt timestamp indicating a time at which the data processing system received the operation request. In some implementations, the data processing system can store, in association with the entry in the operation queue, one or more identifiers of the eligible data records determined at ACT 408, such that the data processing system can access the eligible data records during subsequent timer evaluation and execution operations without re-querying the storage. While the operation request remains in the operation queue, the data processing system may not transmit information about the queued operation request to other client devices or computing systems.

In some implementations, the data processing system can store a timestamp corresponding to a time the operation request is received. The timestamp can indicate a system clock value at the moment the data processing system received the operation request via the network. The data processing system can store the timestamp in association with an identifier of the operation request in one or more data structures in the storage. The timestamp can be a reference point from which the data processing system can measure elapsed time for the operation request during subsequent timer evaluations at ACT 410 and ACT 412.

The method 400, at ACT 410, can include initiating a timer corresponding to receipt of the operation request. The data processing system can generate a new timer entry in one or more data structures and can populate a start timestamp field of the timer entry with the timestamp stored at ACT 408. The timer can track elapsed time for the operation request relative to the stored timestamp. In some implementations, a background timer process executing on the data processing system can evaluate the timer on a periodic or continuous basis by computing a difference between a current system time and the start timestamp of the timer. The background timer process can run as a separate thread, loop, and/or event listener that evaluates each of the active timers of pending operation requests. The data processing system can associate the timer with the operation request in the operation queue, such that the timer and the operation request can be accessed together during the determination at ACT 412.

The method 400, at ACT 412, can include determining that the timer satisfies at least one of the first latency parameter or the second latency parameter. In various examples, in some implementations, the data processing system can calculate an elapsed time for the operation request based on the timestamp and a current time. The elapsed time can represent a duration between the time the data processing system received the operation request and the current system time at which the calculation is performed. The data processing system can perform the calculation by subtracting the stored timestamp from the current system time value. The background timer process can perform the elapsed time calculation on each evaluation cycle and can compare the resulting elapsed time value against one or more latency parameters associated with eligible data records at the price value specified by the operation request.

To do so, in some implementations, the data processing system can compare, based on initiating the timer for the operation request, the timer with the first latency parameter, the second latency parameter, and the default latency parameter. The data processing system can retrieve, from storage, the latency parameters associated with each eligible data record at the price value specified by the operation request. The data processing system can rank/select/filter the eligible data records according to the respective latency parameters, such that a data record associated with a shorter latency parameter is ranked higher (or selected, provided as output of a filtering operation) than a data record associated with a longer latency parameter. For example, the first data record associated with the first latency parameter of one second can be ranked higher than the second data record associated with the second latency parameter of one and a half seconds, and the second data record can be ranked higher than a third data record associated with the default latency parameter of two seconds. The data processing system can evaluate the elapsed time of the timer against the latency parameter of the highest-ranked data record first and can proceed to evaluate the elapsed time against subsequent latency parameters in rank order as additional time elapses.

The determination at ACT 412 can control whether the method 400 proceeds to ACT 414 or ACT 416. When the elapsed time of the timer satisfies the first latency parameter before satisfying the second latency parameter, the data processing system can proceed to ACT 414 to execute the operation request with respect to the first data record (or set of data records having the first latency parameter). For example, where the first latency parameter specifies a delay of one second and the second latency parameter specifies a delay of two seconds, the data processing system can determine that the elapsed time of the timer meets or exceeds one second while remaining below two seconds, and the data processing system can proceed to ACT 414 to execute the operation request with respect to the first data record at the one-second mark. When the elapsed time of the timer satisfies the second latency parameter before satisfying the first latency parameter, the data processing system can proceed to ACT 416 to execute the operation request with respect to the second data record using similar techniques.

In some implementations, the first latency parameter and the second latency parameter can specify the same time value. In such implementations, the data processing system can determine that the elapsed time of the timer satisfies both the first latency parameter and the second latency parameter at the same point in time. The data processing system can select between proceeding to ACT 414 or ACT 416 based on one or more tiebreaking criteria, such as a timestamp indicating a time at which each respective data record was generated, a quantity available in each respective data record, and/or an identifier of the computing system that submitted the request to generate each respective data record, among others. The tiebreaking criteria may be specified in configuration settings of the data processing system by one or more operators of the data processing system. For example, where both the first latency parameter and the second latency parameter specify a delay of one second, the data processing system can determine that the elapsed time meets or exceeds one second for both eligible data records and can select the data record having the earlier generation timestamp for execution at ACT 414, with the remaining data record available for execution at ACT 416 with respect to any remaining quantity of the operation request.

The method 400, at ACT 414, can include executing the operation request with respect to the first data record based on determining that the timer satisfies the first latency parameter. The data processing system can execute the operation request by matching at least a portion of the operation request against the first data record at the price value specified by the operation request. Executing the operation request with respect to the first data record can include updating a quantity parameter of the first data record to reflect a reduction corresponding to the portion of the operation request that was filled against the first data record. The data processing system can generate an execution record indicating the quantity executed, the price value at which execution occurred, an identifier of the first data record, and/or an identifier of the operation request, among others. In some implementations, the data processing system can transmit, to the client device and/or computing system that submitted the operation request, a confirmation message indicating the executed quantity and the corresponding data record. In some implementations, the data processing system can update a status indicator of the first data record from open to partially executed when a remaining quantity of the first data record is greater than zero after the execution, and can update the status indicator from open to closed when the remaining quantity of the first data record reaches zero.

In some implementations, the operation request can specify a quantity and a price. The data processing system can execute the operation request with respect to the first data record based on executing at least a portion of the quantity with respect to the first data record. The quantity can indicate a number of units of the event contract that the operation request seeks to fill at the specified price value. The data processing system can determine an available quantity of the first data record at the specified price value and can execute the operation request for the lesser of the quantity specified by the operation request and the available quantity of the first data record. For example, the operation request can specify a quantity of one hundred units at a price of sixty dollars, and the first data record can have an available quantity of thirty units at the same price of sixty dollars. In such an example, the data processing system can execute thirty units of the operation request against the first data record and can retain the remaining seventy units of the operation request for subsequent execution against other eligible data records.

In some implementations, the data processing system can determine, based on a remaining quantity of the operation request after executing with respect to the first data record, that a portion of the operation request remains unexecuted. In such implementations, the data processing system can maintain the timer for the operation request to permit subsequent executing of the portion of the operation request with respect to the second data record upon determining that the timer satisfies the second latency parameter. The data processing system can calculate the remaining quantity by subtracting the executed quantity from the quantity specified by the operation request. When the remaining quantity is greater than zero, the data processing system can retain the operation request in the operation queue with an updated quantity parameter reflecting the remaining quantity. The timer can continue to track elapsed time relative to the original receipt timestamp of the operation request, such that the data processing system does not reset or reinitiate the timer after the partial execution at ACT 414. The data processing system can evaluate the elapsed time of the timer against the second latency parameter associated with the second data record on each evaluation cycle of the background timer process, and can release the remaining quantity of the operation request for execution with respect to the second data record once the elapsed time meets or exceeds the second latency parameter.

In some implementations, the data processing system can determine, based on executing the operation request, that the first data record is closed, and may proceed to execute ACT 416 to execute any remaining portions of the operation request with respect to remaining available data records having a matching price value (e.g., the second data record). The data processing system can determine that the first data record is closed when the available quantity of the first data record reaches zero as a result of the execution at ACT 414. Upon determining that the first data record is closed, the data processing system can update the status indicator of the first data record to closed and can remove the first data record from the set of eligible data records at the specified price value. The data processing system can re-evaluate the remaining eligible data records at the specified price value according to the respective latency parameters to identify the next data record for execution against the remaining quantity of the operation request. In some implementations, the data processing system can update a data structure (e.g., the data structure described in connection with ACT 406) stored in association with the event to reflect the closed status of the first data record and the remaining eligible data records available for subsequent execution.

The method 400, at ACT 416, can include executing the operation request with respect to the second data record based on determining that the timer satisfies the second latency parameter. The data processing system can execute the operation request with respect to the second data record by matching at least a portion of a remaining quantity of the operation request against the second data record at the price value specified by the operation request. In some implementations, the data processing system can determine that the elapsed time of the timer meets or exceeds the second latency parameter associated with the second data record before releasing the remaining quantity for execution. The data processing system can update a quantity parameter of the second data record to reflect a reduction corresponding to the portion of the operation request filled against the second data record. The data processing system can generate an execution record for the execution at ACT 416 that indicates the quantity executed against the second data record, the price value, and/or an identifier of the operation request, among others. In some implementations, the data processing system can transmit a confirmation message to the client device and/or computing system that submitted the operation request indicating the executed quantity and the identifier of the second data record. The data processing system can update a status indicator of the second data record from open to closed when a remaining quantity of the second data record reaches zero as a result of the execution at ACT 416.

Furthering the example above where a portion of the operation request was not satisfied after execution of ACT 414, in some implementations, the data processing system can remove the timer in response to executing the portion of the operation request with respect to the second data record, for example, if there are no un-executed portions of the operation request remaining. The data processing system can determine whether un-executed portions of the operation request remain by comparing a cumulative executed quantity across ACT 414 and ACT 416 against the quantity specified by the operation request. When the cumulative executed quantity equals the quantity specified by the operation request, the data processing system can remove the timer from the one or more data structures in the storage (e.g., storage 215) and can remove the corresponding entry from the operation queue. In some implementations, when the cumulative executed quantity remains less than the quantity specified by the operation request after execution at ACT 416, the data processing system can retain the timer and can continue to evaluate the elapsed time against latency parameters associated with additional eligible data records at the specified price value. The data processing system can repeat the ranking and selection process described in connection with ACT 412 for the remaining quantity of the operation request until the operation request is fully executed or until no further eligible data records remain at the specified price value.

The data processing system can perform similar operations to those described in connection with FIG. 4 for any number of operation requests. For example, the data processing system may receive a second operation request and initiate a second timer according to the second operation request using the techniques described herein. Although the first data record may have been selected as an eligible data record, following the operations of ACT 414 with respect to a previously-received operation request, the first data record may be marked closed, inactive, and/or filled. In some implementations, the data processing system can determine that the second timer associated with the second operation request for the event satisfies the second latency parameter. The data processing system can execute the second operation request with respect to the second data record based on determining that the second timer satisfies the second latency parameter. In some implementations, the data processing system can evaluate the second timer against each latency parameter associated with each remaining eligible data record at the price value specified by the second operation request, and can rank the remaining eligible data records according to the respective latency parameters using the techniques described in connection with ACT 412. The data processing system can execute the second operation request with respect to a highest-ranked remaining eligible data record once the second timer satisfies the corresponding latency parameter of the highest-ranked (e.g., selected, filtered) remaining eligible data record.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the various computing systems described herein can include a single module, a logic device having one or more processing modules, or one or more servers.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereafter, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided may be useful for implementing network applications, the systems and methods described herein may be applied to other environments. The foregoing implementations are illustrative rather than limiting of the described systems and methods. The scope of the systems and methods described herein may thus be indicated by the appended claims, rather than the foregoing description, and changes that come within the meaning and range of equivalency of the claims are embraced therein.

What is claimed is:

1. A system, comprising:

one or more processors coupled to non-transitory memory, the one or more processors configured to:

receive, from a first computing system, a first request to generate a first data record corresponding to an event, the first request comprising a first latency parameter, the first latency parameter being a configurable parameter that specifies a first minimum processing delay for operations identifying the event;

receive, from a second computing system, a second request to generate a second data record corresponding to the event, the second request comprising a second latency parameter, the second latency parameter specifying a second minimum processing delay for operations identifying the second data record, the second latency parameter different from the first latency parameter;

generate, based on the first request and the second request, the first data record in association with the first latency parameter and the second data record in association with the second latency parameter;

receive an operation request corresponding to the event;

initiate a timer corresponding to receipt of the operation request;

determine that the timer satisfies at least one of the first latency parameter or the second latency parameter; and execute the operation request with respect to the first data record based on determining that the timer satisfies the first latency parameter, or execute the operation request with respect to the second data record based on determining that the timer satisfies the second latency parameter.

2. The system of claim 1, wherein the one or more processors are further configured to:

queue the operation request in an operation queue corresponding to the event.

3. The system of claim 1, wherein the operation request specifies a quantity and a price, and wherein the one or more processors are further configured to execute the operation request with respect to the first data record based on executing at least a portion of the quantity with respect to the first data record.

4. The system of claim 3, wherein the one or more processors are further configured to:

determine, based on a remaining quantity of the operation request after executing with respect to the first data record, that a portion of the operation request remains unexecuted; and maintain the timer for the operation request to permit subsequent executing of the portion of the operation request with respect to the second data record upon determining that the timer satisfies the second latency parameter.

5. The system of claim 4, wherein the one or more processors are further configured to:

remove the timer in response to executing the portion of the operation request with respect to the second data record.

6. The system of claim 1, wherein the operation request is a first operation request, and wherein the one or more processors are further configured to:

determine, based on executing the operation request, that the first data record is closed;

determine that a second timer associated with a second operation request for the event satisfies the second latency parameter; and execute the second operation request with respect to the second data record based on determining that the second timer satisfies the second latency parameter.

7. The system of claim 1, wherein the one or more processors are further configured to:

receive, from a third computing system, a third request to generate a third data record; and generate the third data record such that the third data record is assigned to a default latency parameter.

8. The system of claim 7, wherein the one or more processors are further configured to:

compare, based on initiating the timer for the operation request, the timer with the first latency parameter, the second latency parameter, and the default latency parameter.

9. The system of claim 1, wherein the one or more processors are further configured to:

store a timestamp corresponding to a time the operation request is received; and calculate an elapsed time for the operation request based on the timestamp and a current time.

10. The system of claim 1, wherein the one or more processors are further configured to:

store, in association with the event, a data structure identifying the first data record and the second data record and their respective configuration settings; and update the data structure in response to executing at least a portion of the operation request.

11. A method, comprising:

receiving, by one or more processors coupled to non-transitory memory, from a first computing system, a first request to generate a first data record corresponding to an event, the first request comprising a first latency parameter, the first latency parameter being a configurable parameter that specifies a first minimum processing delay for operations identifying the event;

receiving, by the one or more processors, from a second computing system, a second request to generate a second data record corresponding to the event, the second request comprising a second latency parameter, the second latency parameter specifying a second minimum processing delay for operations identifying the second data record, the second latency parameter different from the first latency parameter;

generating, by the one or more processors, based on the first request and the second request, the first data record in association with the first latency parameter and the second data record in association with the second latency parameter;

receiving, by the one or more processors, an operation request corresponding to the event;

initiating, by the one or more processors, a timer corresponding to receipt of the operation request;

determining, by the one or more processors, that the timer satisfies at least one of the first latency parameter or the second latency parameter; and executing, by the one or more processors, the operation request with respect to the first data record based on determining that the timer satisfies the first latency parameter, or executing, by the one or more processors, the operation request with respect to the second data record based on determining that the timer satisfies the second latency parameter.

12. The method of claim 11, further comprising queuing, by the one or more processors, the operation request in an operation queue corresponding to the event.

13. The method of claim 11, wherein the operation request specifies a quantity and a price, and further comprising executing, by the one or more processors, the operation request with respect to the first data record based on executing at least a portion of the quantity with respect to the first data record.

14. The method of claim 13, further comprising:

determining, by the one or more processors, based on a remaining quantity of the operation request after executing with respect to the first data record, that a portion of the operation request remains unexecuted; and maintaining, by the one or more processors, the timer for the operation request to permit subsequent executing of the portion of the operation request with respect to the second data record upon determining that the timer satisfies the second latency parameter.

15. The method of claim 14, further comprising removing, by the one or more processors, the timer in response to executing the portion of the operation request with respect to the second data record.

16. The method of claim 11, wherein the operation request is a first operation request, and further comprising:

determining, by the one or more processors, based on executing the instructions to execute the operation request, that the first data record is closed;

determining, by the one or more processors, that a second timer associated with a second operation request for the event satisfies the second latency parameter; and executing, by the one or more processors, second instructions to execute the second operation request with respect to the second data record based on determining that the second timer satisfies the second latency parameter.

17. The method of claim 11, further comprising:

receiving, by the one or more processors, from a third computing system, a third request to generate a third data record; and generating, by the one or more processors, the third data record such that the third data record is assigned to a default latency parameter.

18. The method of claim 17, further comprising comparing, by the one or more processors, based on initiating the timer for the operation request, the timer with the first latency parameter, the second latency parameter, and the default latency parameter.

19. The method of claim 11, further comprising:

storing, by the one or more processors, a timestamp corresponding to a time the operation request is received; and calculating, by the one or more processors, an elapsed time for the operation request based on the timestamp and a current time.

20. The method of claim 11, further comprising:

storing, by the one or more processors, in association with the event, a data structure identifying the first data record and the second data record and their respective configuration settings; and updating, by the one or more processors, the data structure in response to executing at least a portion of the operation request.

* * * * *